United States Patent
Moshal et al.

(10) Patent No.: US 11,354,674 B2
(45) Date of Patent: Jun. 7, 2022

(54) NETWORKED ELECTRONIC TRANSACTION CONFIRMATION

(71) Applicant: GELLINER LIMITED, Isle of Man (GB)

(72) Inventors: Martin Paul Moshal, Queens Way Quay (GI); David de Villiers, Ballito (ZA)

(73) Assignee: Gelliner Limited, Isle of Man (GB)

( * ) Notice: Subject to any disclaimer, the term of this patent is extended or adjusted under 35 U.S.C. 154(b) by 298 days.

(21) Appl. No.: 16/302,931

(22) PCT Filed: Jul. 24, 2017

(86) PCT No.: PCT/GB2017/052157
§ 371 (c)(1),
(2) Date: Nov. 19, 2018

(87) PCT Pub. No.: WO2018/020225
PCT Pub. Date: Feb. 1, 2018

(65) Prior Publication Data
US 2019/0197556 A1   Jun. 27, 2019

(30) Foreign Application Priority Data
Jul. 29, 2016 (GB) ..................... 1613132

(51) Int. Cl.
*G06Q 20/42* (2012.01)
*G06Q 20/02* (2012.01)
(Continued)

(52) U.S. Cl.
CPC ............. *G06Q 20/42* (2013.01); *G06Q 20/02* (2013.01); *G06Q 20/20* (2013.01); *G06Q 20/327* (2013.01); *G06Q 20/3278* (2013.01)

(58) Field of Classification Search
CPC ........ G06Q 20/42; G06Q 20/02; G06Q 20/20; G06Q 20/327; G06Q 20/3278
(Continued)

(56) References Cited

U.S. PATENT DOCUMENTS

| 5,345,598 A | 9/1994 | Dent |
| 2003/0089780 A1 | 5/2003 | Goodyear et al. |

(Continued)

FOREIGN PATENT DOCUMENTS

| EP | 2 824 629 A1 | 1/2015 |
| KR | 1020150111446 A | 10/2015 |

(Continued)

OTHER PUBLICATIONS

"Bluetooth Smart Technology Unveiled as the Magic Behind Beacons: Intelligent, Power-efficient Wireless Technology Makes In-Store Couponing, Mobile Payments and Location-based Services a Reality." M2 Presswire. Coventry: Normans Media Ltd. Jan. 28, 2014. (Year: 2014).*

(Continued)

*Primary Examiner* — Sara C Hamilton
(74) *Attorney, Agent, or Firm* — McDonnell Boehnen Hulbert & Berghoff LLP

(57) ABSTRACT

Disclosed herein are methods and apparatus related to making payments in response to payment requests. For example, a payment request signaling device (PRSD) may obtain a file representing an electronic payment transaction. A plurality of computing devices proximate to the PRSD may receive an inquiry from the PRSD. In response, the computing devices may transmit respective identifiers of the computing devices. The PRSD may receive, from the plurality of computing devices, wireless signals indicating the respective identifiers. The PRSD may determine a particular computing device associated with a strongest of the received (Continued)

wireless signals. The PRSD may transmit the file to the particular computing device. A payment application executing on the computing device may receive the file from the PRSD. In response, a graphical user interface of the computing device may display information regarding the electronic payment transaction.

20 Claims, 10 Drawing Sheets

(51) Int. Cl.
  *G06Q 20/20* (2012.01)
  *G06Q 20/32* (2012.01)
(58) Field of Classification Search
  USPC .............................................. 705/18, 40, 44
  See application file for complete search history.

(56) References Cited

U.S. PATENT DOCUMENTS

| | | | |
|---|---|---|---|
| 2005/0086171 A1* | 4/2005 | Abe ...................... | G06Q 30/06 705/51 |
| 2005/0281237 A1 | 12/2005 | Heinonen et al. | |
| 2007/0159301 A1* | 7/2007 | Hirt ...................... | H04W 12/04 340/10.1 |
| 2008/0154704 A1 | 6/2008 | Flake et al. | |
| 2010/0177728 A1 | 7/2010 | Chang | |
| 2011/0137773 A1 | 6/2011 | Davis, III et al. | |
| 2011/0264527 A1 | 10/2011 | Fitzpatrick et al. | |
| 2012/0173427 A1* | 7/2012 | Sparks ................. | G07F 7/1008 705/44 |
| 2012/0316963 A1 | 12/2012 | Moshfeghi | |
| 2013/0198081 A1 | 8/2013 | Royyuru et al. | |
| 2014/0006191 A1* | 1/2014 | Shankar ............... | H04W 8/005 705/18 |
| 2014/0188708 A1 | 7/2014 | Govindarajan et al. | |
| 2014/0279101 A1 | 9/2014 | Duplan et al. | |
| 2015/0031393 A1* | 1/2015 | Post ..................... | H04W 4/025 455/456.2 |
| 2015/0269638 A1 | 9/2015 | Chatterton et al. | |
| 2015/0296476 A1* | 10/2015 | Wilmhoff ............. | G01S 3/14 455/456.1 |
| 2016/0037549 A1* | 2/2016 | Seo ...................... | H04W 76/14 370/329 |
| 2016/0073349 A1* | 3/2016 | Mohan ................. | H04W 76/14 455/426.1 |
| 2016/0086156 A1 | 3/2016 | Deshpande | |
| 2016/0092880 A1 | 3/2016 | Klingen | |
| 2017/0032354 A1* | 2/2017 | Tilahun .............. | G06Q 20/3278 |
| 2017/0251340 A1* | 8/2017 | Sanders .................. | H04W 4/02 |

FOREIGN PATENT DOCUMENTS

| | | | |
|---|---|---|---|
| WO | 98/45962 | A1 | 10/1998 |
| WO | 2011/011637 | A2 | 1/2011 |
| WO | 2011104514 | A1 | 9/2011 |
| WO | 2013/190168 | A1 | 12/2013 |
| WO | 2015/039254 | A1 | 3/2015 |

OTHER PUBLICATIONS

United Kingdom Combined Search and Examination Report for GB 1613132.8 dated Jan. 22, 2018, pp. 1-9.
The International Search Report (ISR) with Written Opinion for PCT/GB2017/052157 dated Sep. 14, 2017, pp. 1-14.
Australian Examination report No. 3 dated Feb. 26, 2020 for Australian Application No. 2017304749, six pages.
Examination Report dated Mar. 30, 2020, in corresponding Great Britain Patent Application No. 1613132.8, 6 pages.
Australian Examination Report dated Oct. 5, 2019 for Australian Application No. 2017304749, 3 pages.
European Patent Office, Examination Report dated Jul. 6, 2020, issued in connection with European Patent Application No. 17748863.2, 5 pages.
United Kingdom Intellectual Property Office, Examination Report dated Nov. 2, 2020, in corresponding Great Britain Patent Application No. 1613132.8 filed Jul. 29, 2016, 8 pages.
Canadian Patent Office, Examination Report dated Jul. 29, 2020 issued in connection with Canadian Application No. 3,029,506, 5 pages.
Australian Intellectual Property Office, Examination Report dated Mar. 12, 2021, in corresponding Australian Patent Application No. 2020202089 filed Mar. 24, 2020, 8 pages.
Examination Report dated Jan. 27, 2022, in corresponding Canadian Patent Application No. 3,029,506, 6 pages.
European Patent Office Communication, Decision to refuse a European Patent application, Application No. 17748863.2, dated Mar. 30, 2022, 17 pages.

* cited by examiner

NETWORKED ELECTRONIC TRANSACTION CONFIRMATION

CROSS-REFERENCE TO RELATED APPLICATIONS

This application is a national phase entry of, and claims priority to, PCT Patent Application No. PCT/GB2017/052157, filed Jul. 24, 2017.

PCT Patent Application No. PCT/GB2017/052157 claims priority to U.K. Patent Application No. 1613132.8, filed on Jul. 29, 2016. These prior applications are considered part of this application and are incorporated by reference in their entirety herein.

BACKGROUND

In order to carry out a payment transaction between a merchant and a customer, most secure payment systems in use today rely on the merchant having a secure card reader device (either magnetic stripe- or Electron/MasterCard/Visa-based), as well as an active connection to a transaction server. The merchant is responsible for conducting the payment transaction and for verifying whether the payment transaction has been successful. The customer need only present a payment card to the merchant and enter a personal identification number (or "PIN") on the merchant's card reader device.

Merchant payment devices are complex and expensive to design and develop. In most cases, such payment devices require certification, which increases the cost of such devices.

An alternative model of a secure payment system provides for the customer to control the transaction by using the customer's own trusted device, such as the customer's smartphone for example, instead of the merchant's card reader device. Such mobile payments add another layer of security to a payment transaction, as reliance on the merchant's payment device is eliminated. As a result, electronic payments using mobile phones are becoming increasingly important and widespread.

A total amount payable by a customer for a transaction is generally displayed on one or more of a display terminal, a pole display, or printed on an invoice or a bill. The customer may then make a payment by means of any payment option accepted by the merchant, for example cash, payment card, voucher, electronic funds transfer, and the like.

The total amount payable is not usually available to the customer in electronic format, resulting in the user having to re-type or to re-enter the amount, thereby increasing the likelihood of errors and resultant incorrect payment transactions.

The applicant has appreciated the desirability of an alternative process for notifying a customer of the details relating to a payment transaction and a selection of electronic payment options.

OVERVIEW

Example embodiments are described herein. A first example embodiment may involve obtaining, by a payment request signaling device, a file representing an electronic payment transaction. The first example embodiment may also involve receiving, by way of a wireless interface of the payment request signaling device, wireless signals from a plurality of computing devices that are proximate to the payment request signaling device. The first example embodiment may additionally involve determining, by the payment request signaling device, a particular computing device associated with a strongest of the received wireless signals. The first example embodiment may further involve transmitting, by way of the wireless interface of the payment request signaling device, the file to the particular computing device. Reception of the file may cause a listener application executing on the particular computing device to display information regarding the electronic payment transaction.

A second example embodiment may include a non-transitory, computer-readable storage medium, having stored thereon program instructions that, upon execution by a computing device, cause the computing device to perform operations in accordance with the first example embodiment.

A third example embodiment may include a computing device, including at least a processor and data storage. The data storage may include program instructions that, when executed by the processor, cause the computing device to perform operations in accordance with the first example embodiment.

A fourth example embodiment may include means for obtaining, by a payment request signaling device, a file representing a request for electronic payment. The fourth example embodiment may also include means for receiving, by way of a wireless interface of the payment request signaling device, wireless signals from a plurality of computing devices that are proximate to the payment request signaling device. The fourth example embodiment may additionally include means for determining, by the payment request signaling device, a particular computing device associated with a strongest of the received wireless signals. The fourth example embodiment may further include means for transmitting, by way of the wireless interface of the payment request signaling device, the file to the particular computing device. Reception of the file may cause a listener application executing on the particular computing device to display information regarding the electronic payment transaction.

A fifth example embodiment may involve receiving, by a computing device, a signal from a wireless beacon. The fifth embodiment may also involve, in response to receiving the signal from the wireless beacon, activating, by the computing device, a listener application on the computing device. The fifth embodiment may additionally involve receiving, by the computing device, an inquiry from a payment request signaling device. The inquiry may include an access code associated with the listener application. The fifth embodiment may further involve, in response to receiving the inquiry, transmitting, by the computing device, an identifier of the computing device. The fifth embodiment may yet further involve receiving, by the listener application executing on the computing device, a file from the payment request signaling device. The file may include a representation of an electronic payment transaction. The fifth embodiment may also include, in response to receiving the file, displaying, on a graphical user interface of the computing device, information regarding the electronic payment transaction.

A sixth example embodiment may include a non-transitory, computer-readable storage medium, having stored thereon program instructions that, upon execution by a computing device, cause the computing device to perform operations in accordance with the fifth example embodiment.

A seventh example embodiment may include a computing device, including at least a processor and data storage. The data storage may include program instructions that, when executed by the processor, cause the computing device to perform operations in accordance with the fifth example embodiment.

An eighth example embodiment may include means for receiving, by a computing device, a signal from a wireless beacon. The eighth example embodiment may also include means for, in response to receiving the signal from the wireless beacon, activating, by the computing device, a listener application on the computing device. The eighth example embodiment may additionally include means for receiving, by the computing device, an inquiry from a payment request signaling device. The inquiry may include an access code associated with the listener application. The eighth example embodiment may further include means for, in response to receiving the inquiry, transmitting, by the computing device, an identifier of the computing device. The eighth example embodiment may yet further include means for receiving, by the listener application executing on the computing device, a file from the payment request signaling device. The file may include a representation of an electronic payment transaction. The eighth example embodiment may even further include means for, in response to receiving the file, displaying, on a graphical user interface of the computing device, information regarding the electronic payment transaction.

A ninth example embodiment may involve receiving, by a transaction server, a payment request to initiate payment of an electronic payment transaction. The payment request may be received from a computing device executing a payment application. The payment request may include indication of a payment instrument associated with the computing device. The ninth example embodiment may additionally involve storing, in one or more databases associated with the transaction server, a representation of the electronic payment transaction. The ninth embodiment may further involve initiating, by the transaction server, payment of the electronic payment transaction using the payment instrument associated with the computing device. The ninth embodiment may yet further involve transmitting, to the computing device, an indication of whether the payment of the electronic payment transaction using the payment instrument associated with the computing device was successful.

A tenth example embodiment may include a non-transitory, computer-readable storage medium, having stored thereon program instructions that, upon execution by a computing device, cause the computing device to perform operations in accordance with the ninth example embodiment.

An eleventh example embodiment may include a computing device, including at least a processor and data storage. The data storage may include program instructions that, when executed by the processor, cause the computing device to perform operations in accordance with the ninth example embodiment.

A twelfth example embodiment may include means for receiving, by a transaction server, an indication of payment of an electronic payment transaction. The indication of payment may be received from a computing device executing a payment application. The indication of payment may include indication of a payment instrument associated with the computing device. The twelfth example embodiment may also include means for storing, in one or more databases associated with the transaction server, a representation of the payment of the electronic payment transaction. The twelfth example embodiment may additionally include means for initiating, by the transaction server, payment of the electronic payment transaction using the payment instrument associated with the computing device. The twelfth example embodiment may further include means for transmitting, to the computing device, an indication of whether the payment of the electronic payment transaction using the payment instrument associated with the computing device was successful.

These as well as other aspects and advantages will become apparent to those of ordinary skill in the art by reading the following detailed description with reference, where appropriate, to the accompanying drawings. Further, it should be understood that the embodiments described in this overview and elsewhere are intended to be examples only and do not necessarily limit the scope of the disclosure.

BRIEF DESCRIPTION OF THE DRAWINGS

Example embodiments are described herein with reference to the drawings, in which.

DETAILED DESCRIPTION

I. Introduction

This description discloses, among other things, example embodiments with respect to making one or more payments in response to one or more payment requests (or more simply, one or more "bills") for payment at a merchant establishment.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The terms "first" and "second" are used to distinguish respective elements and are not used to denote a particular order of those elements.

The following abbreviations or acronyms are used in the description:
CVC—Card Verification Code;
FIG.—Figure;
FIGs.—Figures;
Listener App—Listener Application Program;
Payment App—Payment Application Program;

Request App—Payment Request Application Program; and

PIN—Personal Identification Number.

II. Example Architecture

Figure 1:
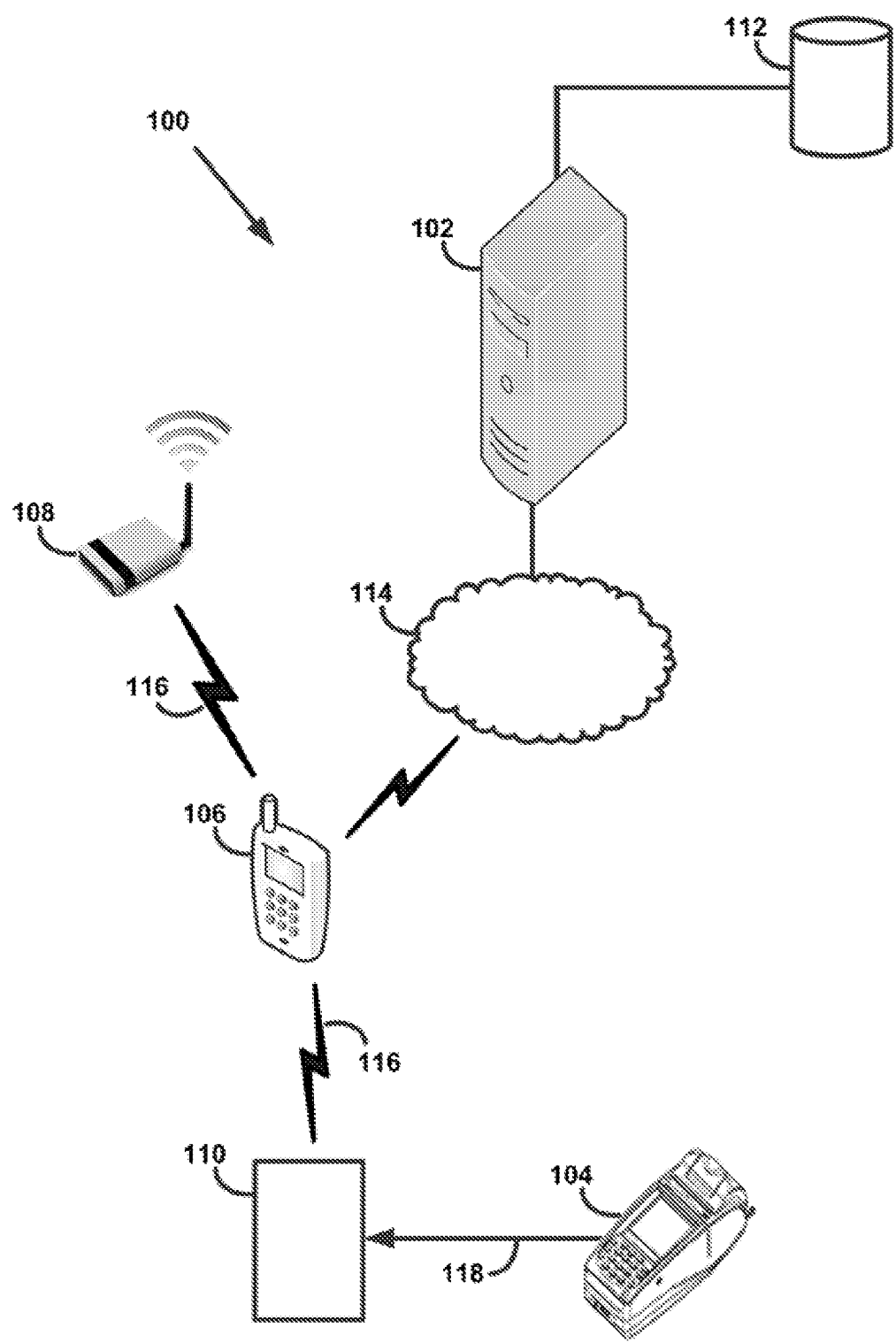
FIG. 1 is a schematic representation of a system for making payment transactions, in accordance with an example embodiment.

FIG. 1 depicts a schematic representation of a system 100 for conducting payment transactions in accordance with example embodiments described herein. The system 100 includes a transaction server 102, a POS device 104, a computing device 106, an electronic beacon 108, a payment request signaling device 110, and a database 112.

The computing device 106 can take the form of a conventional smartphone handset provisioned with a web browser, and software and/or hardware for one or more connections to one or more networks, such as, but not limited to, one or more of: the Internet, a wide area network (WAN), a local area network (LAN), a wired network, and a wireless network such as a WiFi or Bluetooth network. The computing device 106 can be referred to as a "mobile wireless communication device," a "mobile computing device", a "mobile smartphone handset" or, more simply, a "mobile smartphone" or "smartphone." As an example, the mobile wireless communication device can be, or include, a personal digital assistant, a tablet computer, a laptop computer, or a cellular telephone.

The transaction server 102 and the computing device 106 can communicate with each other using a communication network 114. The communication network 114 can comprise a wide-area network, such as the internet. The computing device 106 can communicate with the electronic beacon 108 and with the payment request signaling device 110 by means of communication channel 116. The payment request signaling device 110 can communicate with the POS device 104 by means of communication channel 118. Communication channel 116 can be a wireless communication channel such as a Bluetooth network, for example, while communication channel 118 can be a wired or wireless serial communication channel, among other possibilities.

Communication between the transaction server 102 and the computing device 106 can be facilitated by using a server-hosted program (not shown) that is installed and executed on the server 102 and a payment application program 164 (a 'payment app') that is installed and executed on the computing device 106. Communication between the transaction server 102 and computing device 106 can occur using network interface 152 (shown in FIG. 2) and network interface 184 (shown in FIG. 4).

Communication between the computing device 106, the electronic beacon 108 and the payment request signaling device 110 can be facilitated by a listener application program (a 'listener app') that is installed and executed on the computing device 106. Communication between the computing device 106 and the electronic beacon 108 and the payment request signaling device 110 can occur using network interface 156 (shown in FIG. 2). In some embodiments, the payment app 164 and the listener app 167 may be implemented as part of one app.

The computing device 106 can download a copy of the payment app from a download repository (e.g., the data storage device 188 in FIG. 4), and install the payment app 164 on the computing device 106. In some embodiments, the download repository may be an application store or marketplace accessible via computing device 106. During, or after, installation the payment app 164 may create a user profile 120 on the computing device 106 (e.g., within data storage device 158) and provide a prompt (e.g., by means of user interface 154) to provide data representing personal attributes such as, the user's first name, the user's last name, an e-mail address, a physical address and particulars of one or more payment instruments such as credit cards, debit cards, e-wallets and the like. In accordance with at least some example embodiments, the user profile 120 (e.g., the data in the user profile 120) is stored locally on the computing device 106 and is not stored on the transaction server 102. In other examples, the transaction server stores a user profile 198 that is synchronized with the user profile 120 stored by the computing device 106. That is, when changes are made to the user profile 120 stored by the computing device 106, those changes are provided as updates to the user profile 198 stored on the transaction server 102. The updates may be provided whenever changes to the user profile 120 occur, periodically, or based on inputs received by the computing device 106. This allows for the user profile to be preserved in the event that the computing device 106 malfunctions, or is destroyed. Data transmission between the transaction server 102 and the computing device 106 may be encrypted.

Computing device 106 may also download a copy of the listener app 167 from a download repository (e.g., the data storage device 188 in FIG. 4) and install the listener app 167 on the computing device 106.

POS device 104 may be used by a merchant to generate bills for customers of the merchant's business establishment. In one embodiment, the merchant's business establishment is a retail store and a user of the computing device 106 is a customer of the store.

In this disclosure, the terms 'user' and 'customer' are used interchangeably depending on the context. For example a user of the payment app 164 on the computing device 106 can also be a customer of the merchant.

Figure 2:
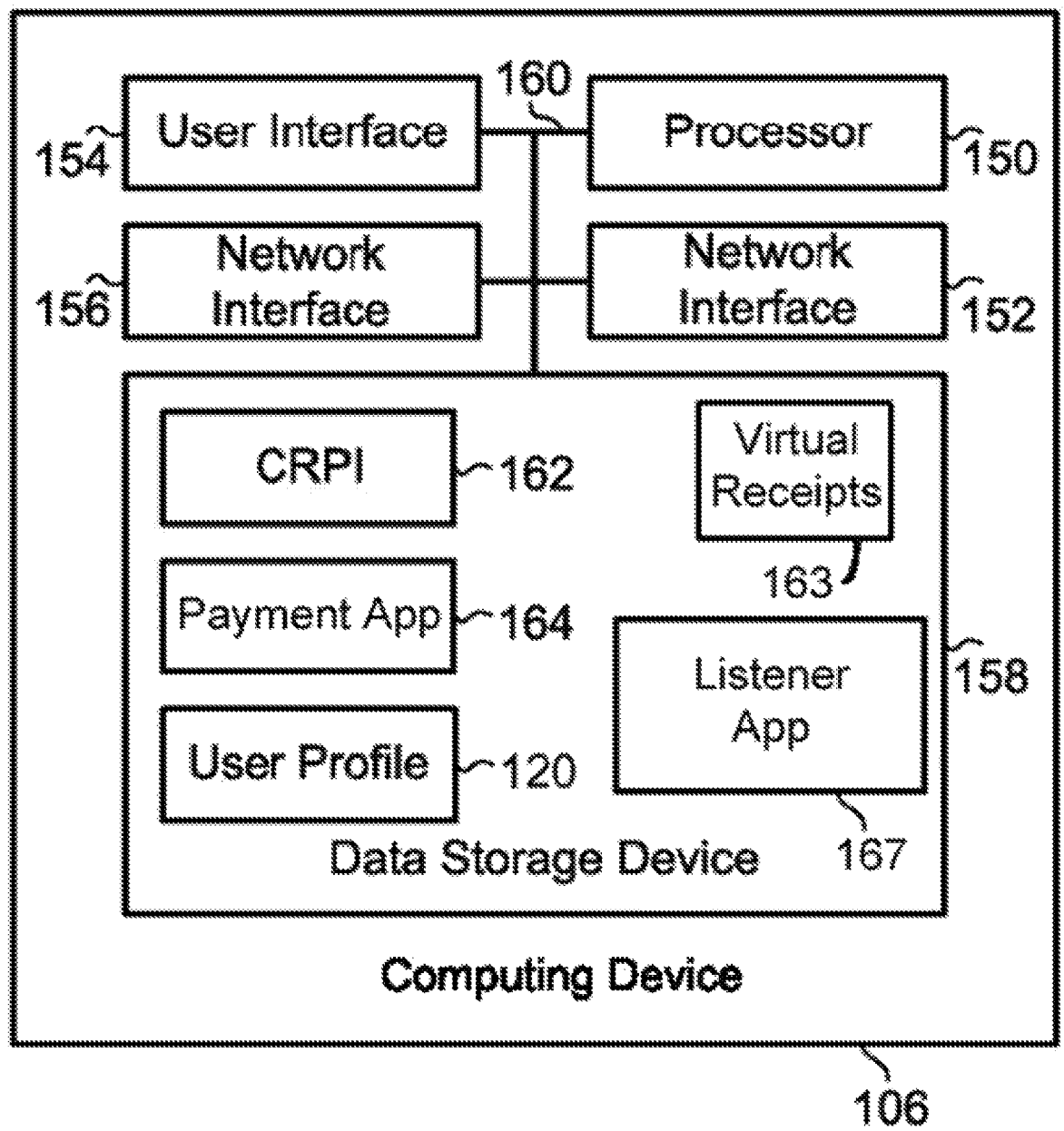
FIG. 2 is a block diagram of a computing device, in accordance with an example embodiment.

Next, FIG. 2 is a block diagram depicting an example embodiment of computing device 106. As shown in FIG. 2, computing device 106 includes (i) a processor 150, (ii) a network interface 152 for transmitting and/or receiving data from communication network 114, (iii) a network interface 156 for transmitting and/or receiving data from communication network 116, (iv) a user interface 154, and (v) a data storage device 158, all of which can be linked together via a system bus or other connection mechanism 160. Data storage device 158 may include computer-readable program instructions (CRPI) 162, the listener app 167, the payment app 164, and a user profile 120. In some examples, CRPI 162 can include the listener app 167 and the payment app 164. Data storage device 158 can comprise a non-transitory computer-readable storage medium readable by processor 150.

Data storage device 158 may include virtual receipts 163. The virtual receipts 163 may include successful virtual receipts. A successful virtual receipt can include data representing one or more images indicating successful payment of a bill issued by a merchant. For example, the one or more images may represent and/or include receipt information such as at least one of (i) a bill identifier and/or reference number, (ii) a merchant identifier, (iii) a location identifier, (iv) an itemization of the bill, (v) a transaction amount, (vi) a transaction date, (vii) an amount paid via a payment instrument associated with the computing device 106 to a payment instrument associated with the merchant, and (viii) payment confirmation information. In this manner, a user may accumulate one or more such images (e.g., virtual receipts) on the user's computing device 106, thereby avoiding the need to collect paper receipts. The user interface 154 may be configured to display the images (e.g., virtual receipts) using a display screen. The virtual receipt may additionally or alternatively include metadata representing the receipt information. In some embodiments, the images may be generated by computing device 106 based on the metadata associated with respective virtual receipts.

In some examples, the virtual receipts 163 may include unsuccessful virtual receipts. An unsuccessful virtual receipt can include data representing one or more images indicating unsuccessful payment of the bill. Such unsuccessful virtual receipts can include information some or all of the above-mentioned receipt information and/or information indicating a reason or reasons for unsuccessful payment; e.g., insufficient funds, incorrect identification of a payment instrument, payment system and/or network failures inhibiting payment.

Each computer-readable storage medium (or, more simply "readable medium") described in this disclosure can include a non-transitory computer-readable medium that includes volatile and/or non-volatile storage components such as optical, magnetic, organic or other memory or disc storage, which can be integrated in whole or in part with a processor. Additionally or alternatively, each computer-readable medium described in this disclosure can include a transitory computer-readable medium. The transitory computer-readable medium can include, but is not limited to, a communications medium such as a digital or analogue communications medium (e.g., a fiber optic cable, a waveguide, a wired communication link, or a wireless communication line).

Each processor described herein can comprise can comprise one or more general purpose processors (e.g., INTEL® single core microprocessors or INTEL® multicore microprocessors) or one or more special purpose processors (e.g., application-specific integrated circuits (ASICs), graphics processing units (GPUs), field-programmable gate array (FPGAs), and/or digital signal processors (DSPs)). Processor 150 is or can be configured to execute CRPI 162.

A network interface, such as network interfaces 152, 156 or any other network interface disclosed herein, can include an interface to one or more networks and/or communication channels. For example, the network interface can include one or more transmitters configured for transmitting data using the one or more networks and/or communication channels, one or more receivers configured for receiving data using the one or more networks and/or communication channels, and/or one or more transceivers configured to both transmit and receive data using the one or more networks and/or communication channels.

The network interface may further include one or more receivers configured to receive data transmitted over the network or communication channel from another device within or on the network or communication channel. Any of the network interfaces disclosed herein can include circuitry, for example electronic circuitry, for converting data received from the network or communication channel to data that can be provided to a processor for processing the received data. For example, the circuitry of the network interfaces can include a modulator and/or demodulator (modem). Any of the network interfaces disclosed herein can include circuitry, for example electronic circuitry, for converting data received from another device, such as a processor or a computer-readable medium, to data in a form that can be transmitted over a network or communication channel.

Electronic beacon 108 may be, for example, a Bluetooth Low-Energy ("BLE") beacon such as an IBEACON® from Apple Inc. of Cupertino, Calif. Such an electronic beacon may use BLE technology to detect other nearby BLE devices such as computing device 106 and may then transmit (i.e., broadcast a unique identification code to such other device. Similar electronic beacons are available from other suppliers such as ESTIMOTE®, Gimbal, ONYX BEACON® and StickNFind, for example.

Figure 3:
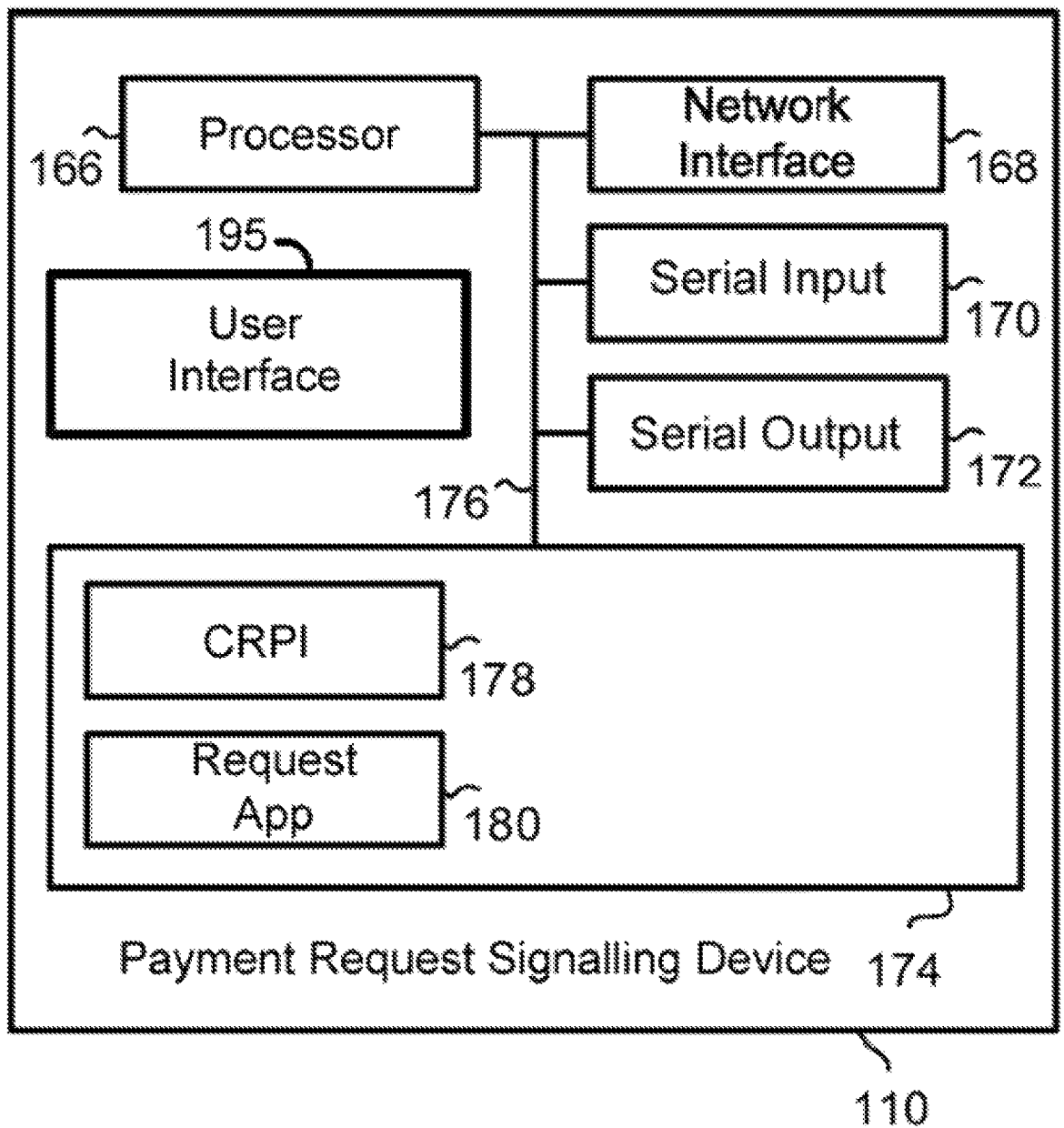
FIG. 3 is a block diagram of a payment request signaling device, in accordance with an example embodiment.

Next, FIG. 3 is a block diagram depicting an example embodiment of payment request signaling device 110. As shown in FIG. 3, payment request signaling device 110 can include (i) a processor 166, (ii) an input communication port 170 for receiving a serial bit stream from POS device 104, (iii) an output communication port 172 for transmitting a serial bit stream to POS device 104, (iv) a network interface 168 for transmitting and/or receiving data from communication network 116, and (iv) a data storage device 174, all of which can be linked together via a system bus or other connection mechanism 176. Data storage device 174 can include (i) CRPI 178, and (ii) a payment request application program (a 'request app') 180 that is installed on the payment request signaling device.

CRPI 178 can include the request app 180. Data storage device 174 can comprise a computer-readable storage medium readable by processor 166. Processor 166 is or can be configured to execute CRPI 178. In some examples, CRPI 178 can include request app 180. In other instances, input 170 and output 172 communication ports may comprise any single or multiple ports configured to engage in serial or non-serial (e.g., parallel) communication via communication network 116. In some examples, the payment request signaling device 110 may include a user interface 195 configured to receive user inputs and provide outputs. For example, the user interface 195 may include a touch-screen or a display screen suitable for displaying a textual representation of a merchant bill.

In some embodiments, part or all of the functionality of POS device 104 and payment request signaling device 110 can be merged.

Figure 4:
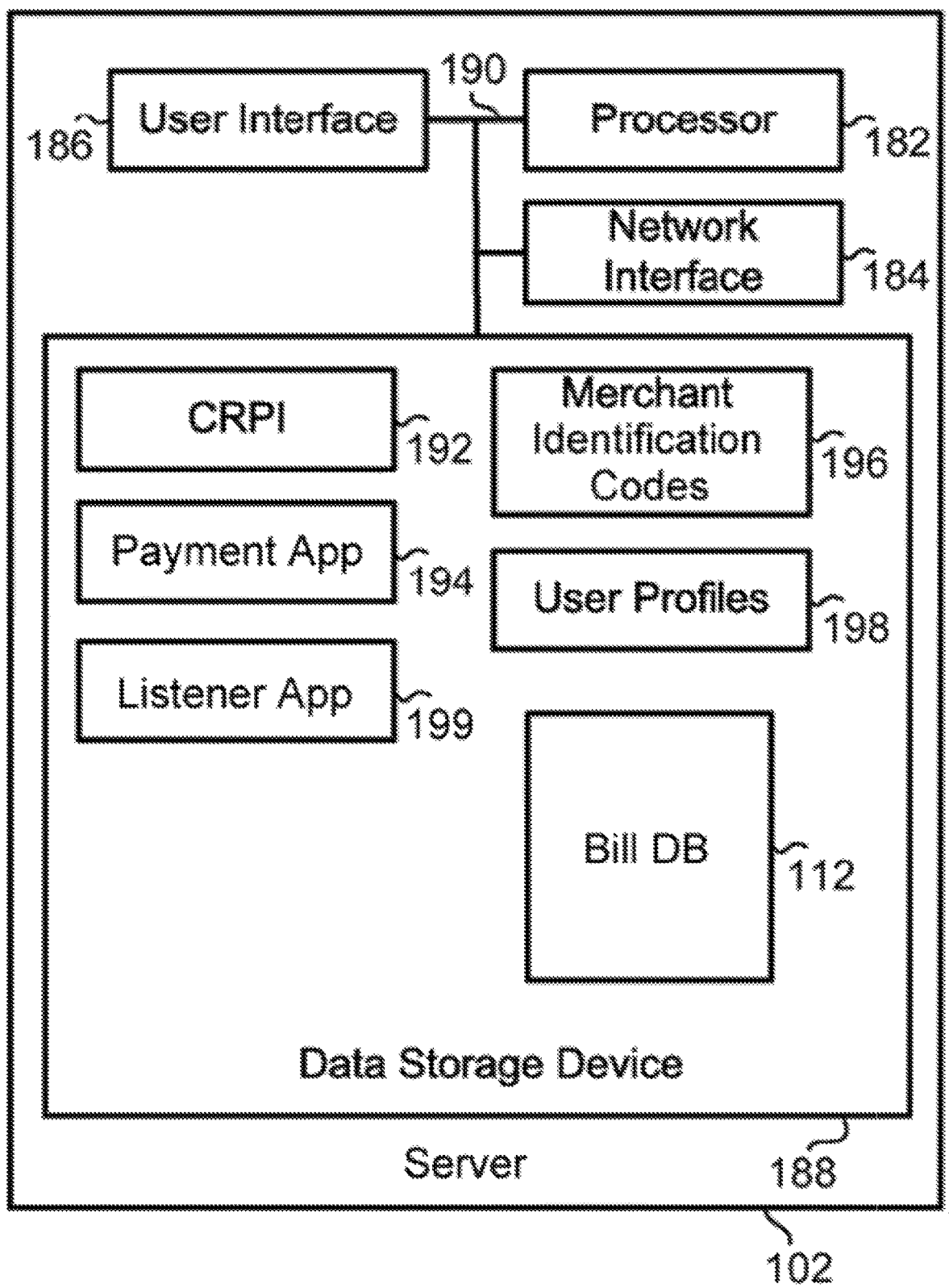
FIG. 4 is a block diagram of a transaction server, in accordance with an example embodiment.

Next, FIG. 4 is a block diagram depicting an example embodiment of transaction server 102. As shown in FIG. 4, transaction server 102 can include (i) a processor 182, (ii) a network interface 184 for transmitting and/or receiving data using communication network 114, (iii) a user interface 186, and (iv) a data storage device 188, all of which can be linked together via a system bus or other connection mechanism 190. Data storage device 188 can include (i) CRPI 192, (ii) the payment app 194 for downloading to computing device 106, (iii) the listener app 199 for downloading to computing device 106, (iv) merchant identifier codes 196 for merchant businesses, (v) user profiles 198, and (vi) bill database 112. In some embodiments, the payment app 194 and the listener app 199 may be stored on the transaction server 102 as installation files representing the respective apps. The installation files, when downloaded and executed by computing device 106, may cause installation of the payment app 164 and the listener app 167 on computing device 106. CRPI 192 can include the payment app 194 and/or the listener app 199. Data storage device 188 can comprise a non-transitory computer-readable storage medium readable by processor 182. Processor 182 is configured to execute CRPI 192. In some examples, the transaction server 102 may include multiple networked computing devices configured to perform any functionality attributed to the transaction server 102 in this disclosure.

III. Example Operations

The system 100 can be used to notify a user present at a merchant establishment of a request from the merchant of payment of a bill, to enable the user to make the payment and, optionally, to notify the merchant of a successful payment. In addition to the example mentioned above, the system 100 is also applicable to payment of any bill that is generated on a POS device associated with any type of merchant. The merchant may have registered and have been assigned a merchant identifier by the transaction server 102. The merchant identifier may be stored on any of the transaction server 102 and the POS device 104.

In some embodiments, communication between computing device 106, electronic beacon 108, and payment request signaling device 110 may take place over a Bluetooth network. Bluetooth is a short-range radio frequency (RF) technology that can be operated in at least the 2.4 GHz range. It can use frequency hopping to minimize interference caused by IEEE 802.11, microwave ovens, other Bluetooth devices. Bluetooth communications can be point-to-point or point-to-multipoint at speeds up to 1 Mbps. Bluetooth signals do not require line-of-sight, can travel through most physical barriers, and have a range of approximately 10 meters.

To discover remote Bluetooth devices, a local Bluetooth device enters the inquiry sub-state. There are a number of different inquiry access codes, each of which allow a Bluetooth device to specify the type of device it is seeking, such as a mobile device, a printer, or a WiFi access point. When in the inquiry sub-state, the local Bluetooth device may generate a channel hopping sequence derived from its clock and the inquiry access code. The hopping sequence can, for example, include a 32-channel subset of the available 79 Bluetooth channels. The local Bluetooth device then broadcasts inquiry messages as it sequentially switches to each channel in the hopping sequence.

Discoverable remote Bluetooth devices will periodically enter the inquiry scan sub-state. In this sub-state, the devices hop according to an inquiry scan hopping sequence, which is based on their respective inquiry access codes and local clocks. If a remote Bluetooth device (a device performing the inquiry scan) receives an inquiry message, it enters the inquiry response sub-state and replies with an inquiry response message. The inquiry response includes the remote Bluetooth device's address and clock.

Some or all discoverable remote Bluetooth devices within the range of the local Bluetooth device may respond to the device inquiry. From the remote Bluetooth devices that have responded to the inquiry, an application operating on the local Bluetooth device or a user thereof may select the desired responding device from a list of discovered remote Bluetooth devices. During this process, the local Bluetooth device and the selected remote Bluetooth device learns the others' respective Bluetooth address.

After obtaining the remote device's Bluetooth address, the local Bluetooth device enters the paging sub-state to establish a connection with the remote Bluetooth device. In the paging sub-state, the local Bluetooth device generates a hopping sequence based on the remote Bluetooth device's address and estimated current clock. The local Bluetooth device then sends one or more page messages as it hops through the sequence of channels.

The remote Bluetooth device (if it allows other devices to connect to it) will periodically enter the page scan sub-state. In this sub-state, a hopping sequence is generated based on its local address and clock. When the remote Bluetooth device receives a page message, it responds to the local Bluetooth device with a page response packet.

Upon receiving the response, the local Bluetooth device sends a frequency hopping synchronization (FHS) packet to the remote Bluetooth device. The FHS packet includes the local Bluetooth device's address and clock. Once the remote Bluetooth device receives the FHS packet, it sends an acknowledgement to the local Bluetooth device. When the local Bluetooth device receives the acknowledgement, it generates a new hopping sequence from its own address and its own clock. The remote Bluetooth device then uses the local Bluetooth device's address and clock to generate a hopping sequence identical to the local Bluetooth device's hopping sequence. The identical hopping sequences allow the devices to hop to the same channels at the same times while remaining connected.

Once the paging process is complete, both devices move to the connection state. The local Bluetooth device sends a poll packet to the remote Bluetooth device verifying that the transition from the page hopping sequence to the new hopping sequence is successful. If successful, the two devices may communicate with one another. During this communication, they may continue frequency hopping in a pseudo-random pattern based on the local Bluetooth device's address and clock for the duration of the connection.

Note that the description above may apply to devices using Bluetooth. Other short-range wireless technologies may use similar or different mechanisms for device discovery and/or communication. Furthermore, the designations "local Bluetooth device" and "remote Bluetooth device" are for purposes of convenience. In various embodiments, any Bluetooth device may assume the role of a local Bluetooth device or a remote Bluetooth device.

Figure 5:
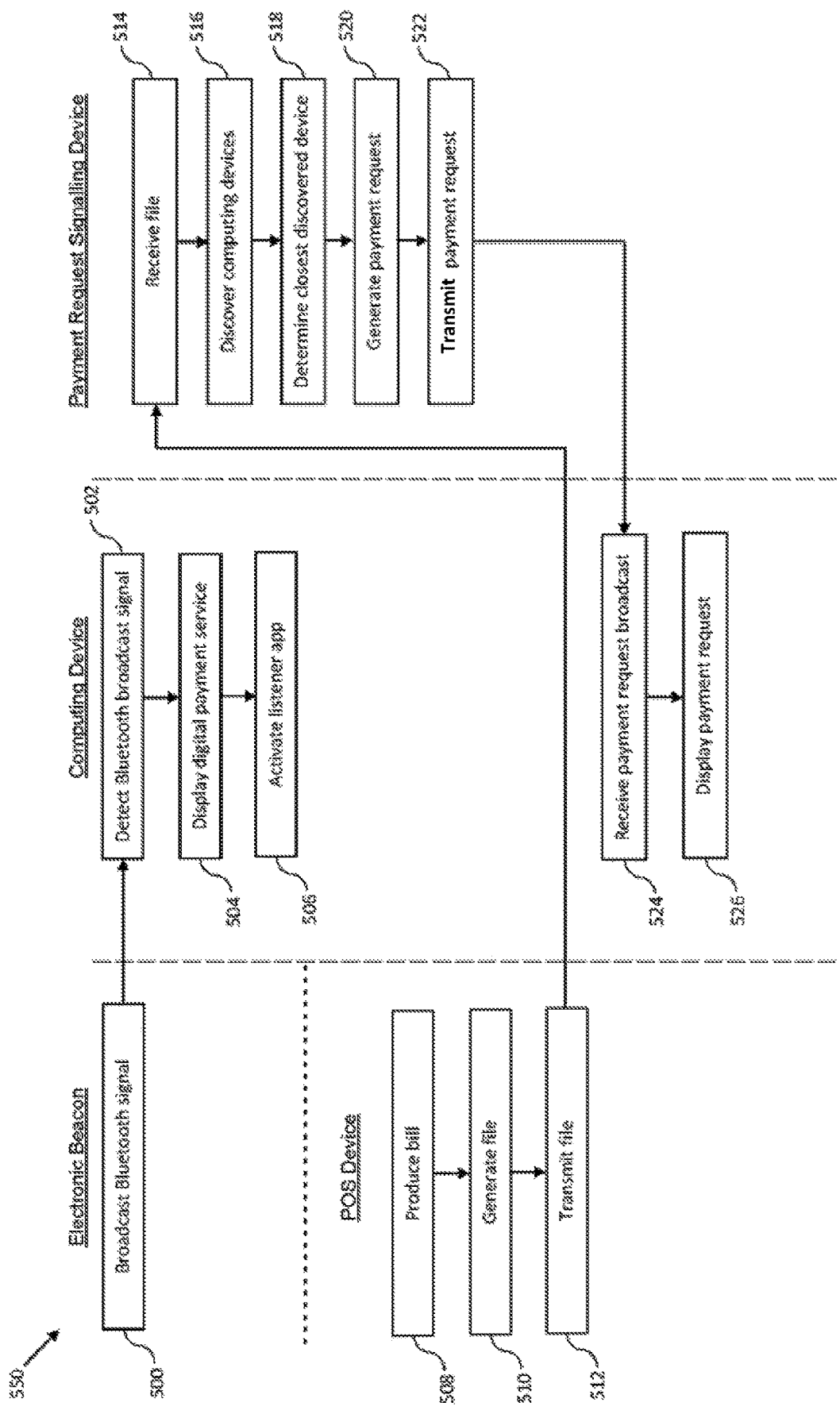
FIG. 5 is a flow chart of operations to request payment of a bill, in accordance with an example embodiment.

FIG. 5 is a flow chart depicting a set of functions 550 that can be carried out in accordance with an example embodiment. The set of functions 550 can be performed to receive a request for payment of a bill issued by a merchant at a merchant establishment. The set of functions 550 are shown within blocks 500 through 526. A description of those blocks now follows.

At block 500 electronic beacon 108 at the merchant establishment broadcasts a Bluetooth signal on communication network 116 that serves to notify customers present at the merchant establishment of the availability of a digital payment service. The strength of the Bluetooth signal emanating from the electronic beacon 108 may be configured so that only customers within a predetermined range of the electronic beacon would be able to receive the signal on their respective computing devices 106. In some embodiments, electronic beacon 108 may be a wireless beacon or transmitter broadcasting a signal according to another short-range radio frequency standard such as, for example, ZIGBEE®.

At block 502, computing device 106 that is within the predetermined range of the electronic beacon 108 may receive and detect the Bluetooth broadcast signal from the electronic beacon 108. The Bluetooth broadcast signal might not be detected by any computing device 106 that is outside the predetermined range of the electronic beacon 108.

At block 504, the detected Bluetooth broadcast signal may cause computing device 106 to display a notification on the user interface 154 of the availability of a digital payment service at the merchant establishment.

Next, at block 506, the detected Bluetooth broadcast signal from the wireless beacon 108 may cause computing device 106 to activate the listener app installed on the computing device. Activation of the listener app may involve the listener app being transitioned from a non-operational state to an operational state. For example, the listener app might initially not be executing, but begins executing after computing device 106 receives the Bluetooth broadcast signal. Alternatively, the listener app may be executing in an idle state and transitions to an active state after computing device 106 receives the Bluetooth broadcast signal. In one example, the listener app may be configured to receive Bluetooth messages from the merchant's payment request signaling device 110.

Next, at block 508, the merchant may produce a bill for payment by providing inputs to the POS device 104. The provided inputs may represent, for example, billing information that includes one or more of a merchant identifier that identifies the merchant, a bill identifier that identifies the bill, a location identifier that identifies the merchant's location (e.g., a physical address or a store number), an employee identifier that identifies an employee of the merchant, an itemization of the bill, any tax such as sales tax or value-added tax included in the bill, and a total amount due. In some examples, instead of the merchant providing input representing the bill identifier, the location identifier, the tax added to the bill, or the total amount due, that information may be (i) stored in the POS device 104, or (ii) otherwise accessible to the POS device 104 and added to the bill without reference to input provided by the merchant to the POS device 104. Generally, any identifier mentioned above may include any numeric, alphanumeric or alphabetic data that identifies a corresponding object (e.g., is recognizable by the server 102, the computing device 106, or the POS device 104 as identifying the corresponding object).

At block 510, POS device 104 can generate a file that contains the billing information, which can include one or more of (i) a bill identifier, (ii) a merchant identifier, (iii) an employee identifier, (iv) a location identifier, (v) information about goods and/or services being billed, such as an itemization of the bill, and (vi) an amount due corresponding to the bill. Herein, a "file" may be any arrangement of data representing the billing information. Thus, for instance, a "file" is not limited to being just a delimited sequence of bytes in a computing device's file system. The file may represent any billing information or parameters otherwise associated with an electronic payment transaction.

The data of the generated file may be formatted or arranged in accordance with a bill template (not shown) stored on POS device 104. The generated file may include any data representing a textual (e.g., alphanumeric) representation of the bill from the merchant.

At block 512 the POS device 104 may then send the generated file to the payment request signaling device 110 via communication channel 118.

At block 514, the payment request signaling device 110 may receive the file using communication interface 170 (or a non-serial port of the data analyzer device 110).

Next, at block 516, payment request signaling device 110 may discover any computing device 106 that is within range of the payment request signaling device and that has an active listener app 167. Discovering computing devices may include receiving, by way of a wireless network interface 168 of the payment request signaling device 110, wireless signals from a plurality of computing devices 106 that are proximate to the payment request signaling device 110. The wireless network interface 168 may be a Bluetooth wireless interface and the wireless signals may be Bluetooth wireless signals.

For example, payment request signaling device 110 may transmit, by way of the wireless network interface 168 of the payment request signaling device 110, a Bluetooth inquiry access code that identifies an electronic payment service, the listener app, and/or the payment app. A computing device 106 may receive the inquiry from the payment request signaling device 110. In response to receiving the inquiry, the computing device 106 may transmit an identifier of the computing device.

The computing device 106 may be one of a plurality of other computing devices within proximity of the payment request signaling device. Each of the plurality of computing devices 106 that receive the Bluetooth inquiry access code may be executing a respective active instance of the listener application. The wireless signals received from the plurality of computing devices 106 may be generated in response to the respective active instances of the listener application transmitting respective responses to the access code. In this scenario, it is possible that only computing devices with an active listener app will respond to the Bluetooth inquiry access code. Regardless, the payment request signaling device 110 may listen to Bluetooth inquiry response message from one or more computing devices that respond, and record the respective identities (e.g., addresses or names) and/or signal strengths of these devices.

At block 518, payment request signaling device 110 may determine the respective strength of the signal transmitted by the Bluetooth network interface 156 of each such discovered computing device. The payment request signaling device 110 may also determine a particular computing device associated with a strongest of the received wireless signals. In some embodiments, determining the particular computing device associated with the strongest of the received wireless signals may include determining a first particular computing device and a second particular computing device associated with a strongest two of the received wireless signals. The Bluetooth signal strength of each discovered computing device 106 may serve as a proxy for a distance between that computing device and the payment request signaling device 110. These signal strengths may be represented in units of dBm (e.g., −85 dBm, −43 dBm) where the higher the dBm value, the greater the signal strength.

Next, at block 520, payment request signaling device 110 may parse the received file to extract the billing information and may generate a payment request. The payment request may include (i) the merchant identifier that identifies the merchant, (ii) the bill identifier that identifies the bill, and (iii) the total amount due. In one example, the payment request may also include any one or more of (iv) an itemization of the merchant's bill, and (v) the tax included in the bill.

Next, at block 522, payment request signaling device 110 may transmit the payment request to the closest discovered computing device 106. Specifically, the payment request signaling device 110 may transmit the file to the particular computing device 106 by way of the wireless network interface 168. For example, payment request signaling device 110 may connect, via Bluetooth, to the closest discovered computing device 106 and then transmit the payment request to this device (e.g., the file). The file may be transmitted at a transmit signal strength that is inversely proportional to the strongest of the received wireless signals.

In situations where there are multiple computing devices that have the same or approximately the same signal strength (e.g., within 1 dBm), payment request signaling device 110 may transmit the payment request to each of these computing devices. For example, when the particular computing device includes the first particular computing device and the second particular computing device associated with a strongest two of the received wireless signals, transmitting the file to the particular computing device may include transmitting the file to the first particular computing device and the second particular computing device. The users of the computing devices to which the payment request does not apply may decline to pay via the user interface of their respective listener apps, for example.

In other scenarios (e.g., on non-Bluetooth wireless networks), the payment request signaling device 110 may broadcast the payment request at a signal strength that is inversely proportional to the strength of the strongest received signal of all the discovered computing devices 106. This would occur as an attempt to ensure that the payment request only reaches the closest discovered computing device 106. As an example, the payment request signaling device 110 may store or have access to a lookup table that functionally represents mappings between received signal strengths and transmit signal strengths. For instance, such a table might associate a received signal strength in the range of −27 to −33 dBm to a transmit signal strength of −40 dBm, as well as a received signal strength in the range of −87 to −93 dBm to a transmit signal strength of −20 dBm. Other examples are possible.

In some embodiments, when confirmation of payment of a bill associated with the transmitted payment request is not received within a predetermined amount of time, the payment request signaling device 110 may rebroadcast the payment request. The rebroadcast payment requests may be transmitted at successively higher signal strengths. The successively higher signal strengths may ensure that the payment request successfully reaches the specific computing device of a user responsible for paying the bill associated with the payment request. For example, the signal path between payment request signaling device 110 and the specific computing device may exhibit a high degree of interference or shielding (e.g., the specific computing device may be in a user's pocket underneath a metal table while payment request signaling device 110 is on top of the table). Accordingly, although the specific computing device may be closest to the payment request signaling device 110, a rebroadcast of the payment request at a higher power may be needed (e.g., due to shielding or interference) before the specific computing device receives the payment request. Further exponential back-off may be implemented to incrementally double the time interval between successive rebroadcasts of the payment request.

At block 524, a listener application executing on the computing device may receive a file from the payment request signaling device. The file may include a representation of an electronic payment transaction (e.g., a payment request). Specifically, the computing device 106 closest to the payment request signaling device may receive the payment request (e.g., the file).

Reception of the file may cause a listener application 167 executing on the particular computing device 106 to display information regarding the electronic payment transaction. Specifically, at block 526, responsive to receiving the payment request notification, the active listener app 167 on the computing device 106 may display the particulars of the payment request on the user interface 154 of the computing device. The displayed information may include part or all of the abovementioned billing information, such as an itemization of the bill (e.g., a list of items purchased and the respective costs of the purchased items), an amount of tax added to the bill, a merchant identifier, a location identifier, and a total amount due, among other possibilities.

Figure 6:
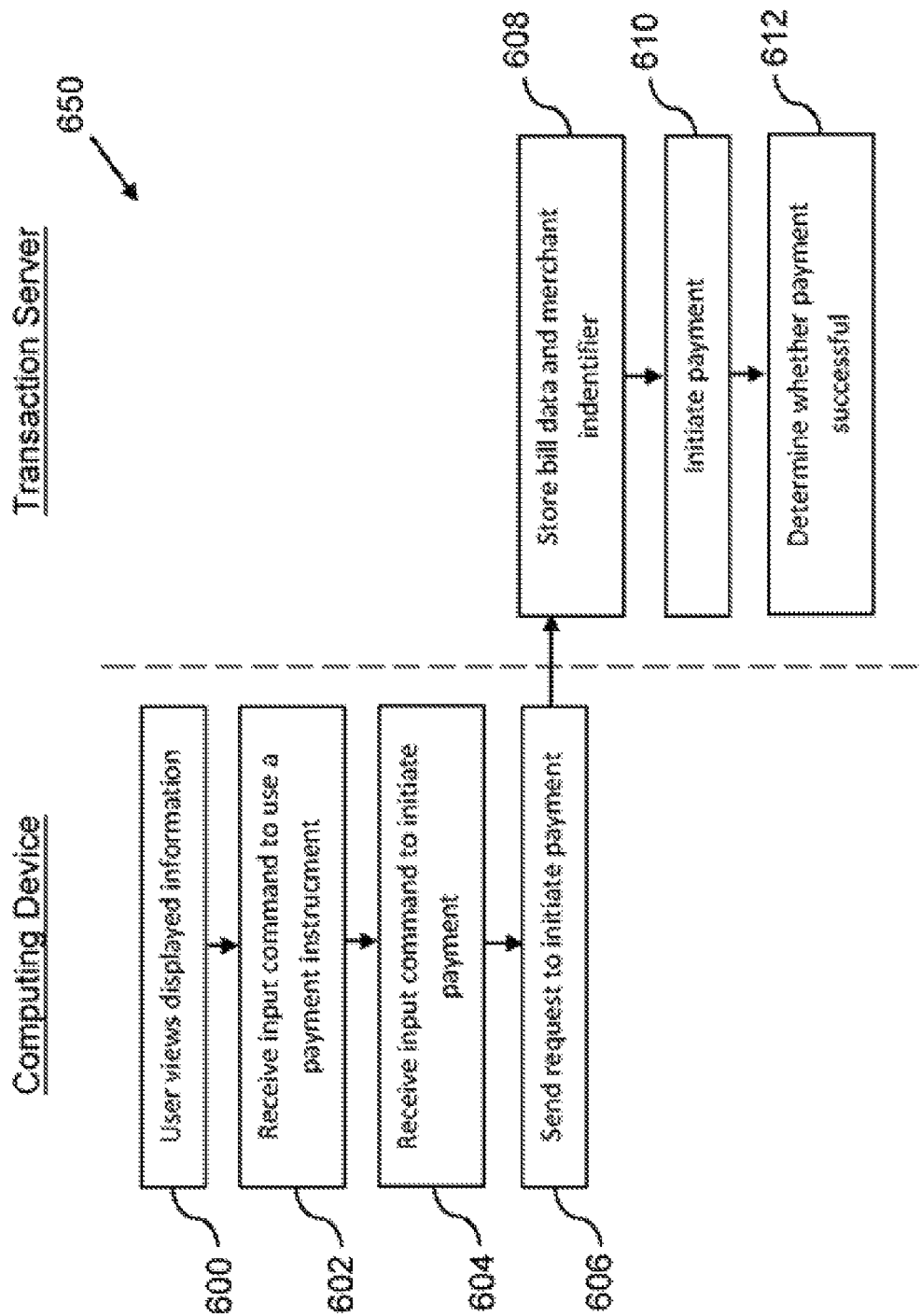
FIG. 6 is a flow chart of operations to carry out bill payment, in accordance with an example embodiment.

FIG. 6 is a flow chart depicting a set of operations 650 that can be carried out in accordance with an example embodiment. The set of operations 650 can be performed to make a payment pursuant to receipt of a payment request from the merchant's payment request signaling device 110. The set of functions 650 is shown within blocks 600 through 612. The information may be displayed by or with the aid of the listener app 167. Selection of the option to pay a particular electronic payment transaction may cause the computing device 106 to launch (e.g., begin executing) the payment app 164. The file representing the electronic payment transaction that the user has selected to pay may be shared with the payment app 164 by the listener app 167.

At block 600, the user can view the displayed information related to the payment request. The information displayed regarding the electronic payment transaction may include options to pay or decline payment of the electronic payment transaction.

At block 602, the computing device 106 may receive input indicating a command to use a payment instrument to pay the merchant's bill associated with the payment request. For example, the display of the user interface 154 may display icons or text representing one or more pre-loaded payment instruments, and user interface 154 may receive input indicating selection of one or more payment instruments. The received input may be provided to payment app 164. The computing device 106 may have information related to the one or more payment instruments stored at user profile 120. Or, the computing device 106 may receive inputs representing information related to a new payment instrument. In another example, the information related to the one or more payment instruments may be stored by data storage device 188 of transaction server 102.

At block 604, user interface 154 may receive input indicating acceptance of the bill for payment. This input can relate to initiating payment of the bill. The input may be provided to payment app 164 that may initiate payment of the bill.

In some embodiments, the payment application 164 may additionally include a feature that allows the user to add a tip or gratuity to the electronic payment transaction. For example, the user interface of the payment application 164 may include buttons corresponding to "5%," "10%," "15%," and a "20%" tip or gratuity on the amount of the electronic payment transaction. The tip or gratuity feature may be merchant-dependent. For example, when the file received by the computing device from the payment request signaling device indicates that the merchant is a restaurant, the payment application may display the tip/gratuity buttons/options. However, when the file indicates that the merchant is a department store, the payment application might not display the tip/gratuity buttons/options.

At block 606, the payment app 164 (of the computing device 106) may then generate and send a payment request, to be received by the transaction server 102, to initiate payment of the total amount due corresponding to the bill. The request may be received by transaction server 102. The request may include at least one of (i) the merchant identifier, (ii) the total amount due to be paid, (iii) a bill identifier corresponding to the bill, and (iv) information related to a payment instrument associated with the computing device; e.g., the payment instrument selected at block 602. The merchant identifier and the bill identifier may include any numeric, alphabetic, or alphanumeric data that respectively identifies the merchant and the bill. The information related to the payment instrument associated with the computing device may include a credit or debit card number, a cardholder name, a card expiration date, a CVC, or a PIN, as stored in the user profile 120. In some examples, data related to the payment instrument associated with the computing device 106 is stored by, and retrieved from, data storage device 188 of the transaction server 102.

Next, at block 608, the transaction server 102 may store, in one or more databases associated with the transaction server, a representation of the payment of the electronic payment transaction. Specifically, the transaction server 102 may store the data representing the bill and/or the merchant identifier in the bill database 112 or elsewhere in data storage device 188.

At block 610, the transaction server 102 can attempt to conduct a payment transaction by initiating payment of the bill based on the payment request received from the computing device 106. Specifically, the transaction server may initiate payment of the electronic payment transaction using the payment instrument associated with the computing device. To initiate payment, the transaction server 102 can send the data related to the payment to a third computing device (e.g., a payment processing system/server). The third computing device (not shown) may be configured to execute payments with a payment instrument associated with the computing device 106 or a user of the computing device 106. In some instances, initiating the payment may include the transaction server 102 retrieving data related to the payment instrument associated with the computing device 106 from data storage device 188. As an example, the data sent by the transaction server 102 to the third computing device may include an amount authorized for payment, the merchant identifier, the merchant's instrument for receiving payment, and information related to the payment instrument.

At block 612, the transaction server 102 may determine whether the payment was successful, perhaps by receiving a message indicating whether the payment was successful from the third computing device. The transaction server may transmit, to the computing device, an indication of whether the payment of the electronic payment transaction using the payment instrument associated with the computing device was successful. A successful payment may include successful transfer of funds using the payment instrument associated with the computing device 106 to the payment instrument associated with the merchant (e.g., a bank account). In some examples, the transaction server 102 may be a payment processor configured to access payment instruments respectively associated with the merchant and the computing device 106, and may internally determine whether payment was successful.

Figure 7:
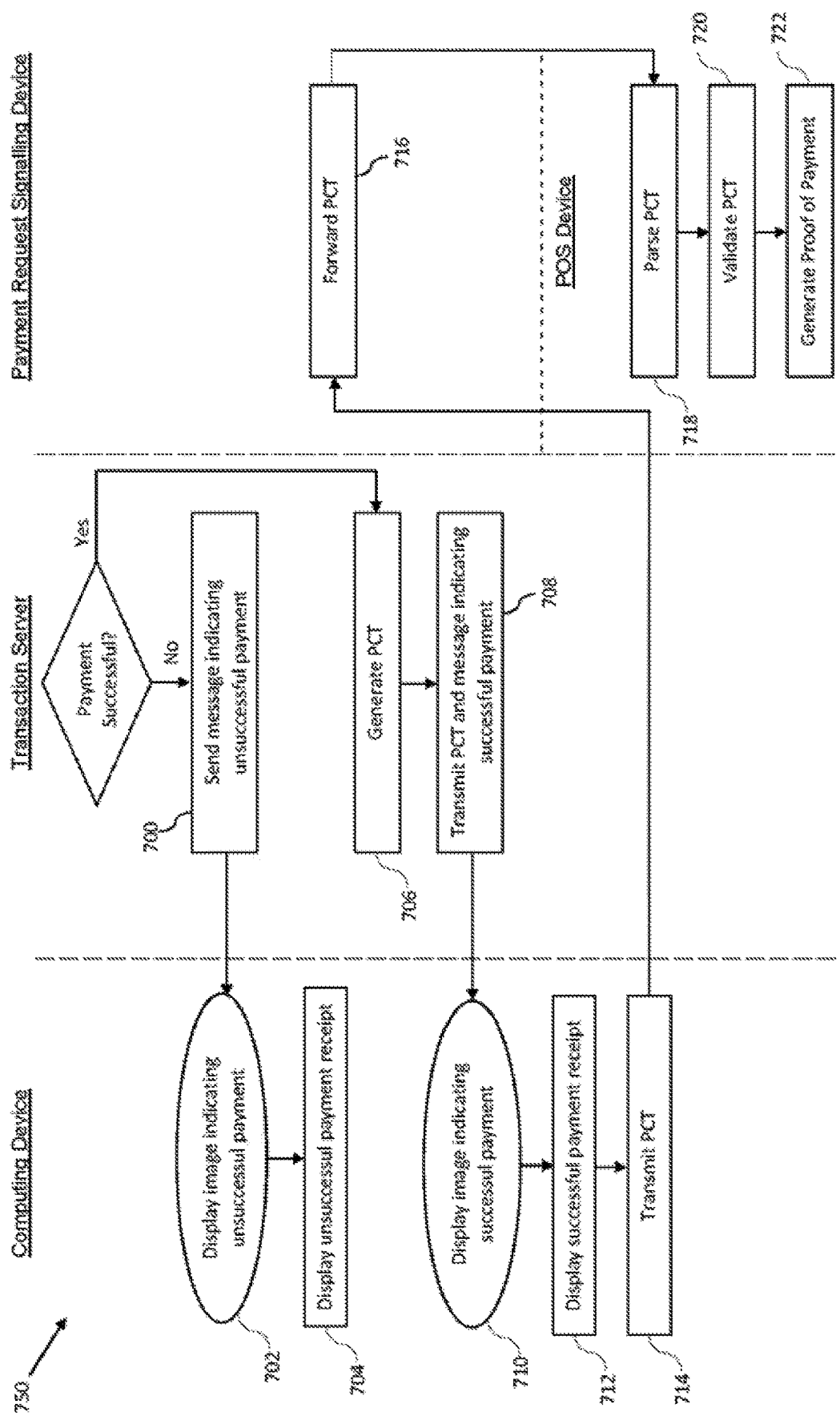
FIG. 7 is a flow chart of operations to carry out payment verification, in accordance with an example embodiment.

FIG. 7 is a flow chart depicting a set of functions 750 that can be carried out in accordance with an example embodiment. The set of functions 750 can be performed to verify that a payment transaction to pay the merchant's bill has completed successfully. The set of functions 750 is shown within blocks 700 to 722.

If the payment transaction is determined to be unsuccessful, the transaction server 102 may, at block 700, generate and transmit a transaction failure notification to the computing device 106. Computing device 106 may receive, from the transaction server, the transaction failure notification indicating that payment of the electronic payment transaction was unsuccessful. The transaction server 102 may also transmit, to the computing device, a request for selection of an alternative payment instrument. The payment app 164 (of the computing device 106) may, at block 702, notify the customer that payment has not been successful and to select a different payment instrument and re-attempt payment.

Specifically, an indication of the transaction failure (e.g., a transaction failure notification) may be displayed on the graphical user interface 154 of the computing device 106. For example, in some embodiments, the transaction failure notification can include an image such as an unsuccessful virtual receipt, such as discussed above in the context of virtual receipts 163. The virtual receipt indicating the transaction failure may be stored on the computing device.

Then, at block 704, the payment app 164 can notify the customer that payment is unsuccessful by displaying the unsuccessful virtual receipt from the transaction success notification. In response to receiving the transaction failure notification, selection of an alternative payment instrument may be received via the graphical user interface 154. In response to receiving the selection of the alternative payment instrument, an indication of the alternative payment instrument may be transmitted to the transaction server 102.

Transaction server 102 may receive, from the computing device, the indication of the alternative payment instrument. The transaction server may, in response to receiving the indication of the alternative payment instrument, initiate payment of the electronic payment transaction using the alternative payment instrument associated with the computing device. The transaction server may also transmit, to the computing device, an indication of whether the payment of the electronic payment transaction using the alternative payment instrument associated with the computing device was successful.

If, however, the payment transaction is determined to have completed successfully, the transaction server 102 may, at block 706, generate a file that contains at least (i) the merchant identifier corresponding to the merchant, (ii) the bill identifier corresponding to the bill, and (iii) the total amount due corresponding to the bill. The generated file will be referred to as a "payment confirmation token" (or, more simply, a "PCT"). The data in the PCT may or may not be encrypted.

Next, at block 708, the transaction server 102 may transmit a transaction success notification that can include the PCT to the computing device 106. In some embodiments, the PCT may indicate successful payment of the electronic payment transaction. The payment app 164 (of the computing device 106) may, at block 710, receive the transaction success notification and notify the customer that payment has been successful. In some embodiments, the transaction success notification can include a successful virtual receipt, such as discussed above in the context of virtual receipts 163. The virtual receipt indicating the transaction success may be stored on the computing device. The virtual receipt may include the PCT. In some embodiments, the customer may be presented with a prompt asking whether a virtual receipt should be stored for a particular electronic payment transaction.

Then, at block 712, the payment app 164 can notify the customer that payment is successful by displaying, on the graphical user interface of the computing device, an indication of the transaction success. In one example, the computing device may display the successful virtual receipt received in the transaction success notification.

Then, at block 714, the computing device 106 may transmit the received PCT to the merchant's payment request signaling device 110 by means of communication network 116. The payment request signaling device 110 may receive, by way of the wireless network interface 168, a payment confirmation token (PCT) from the particular computing device. Next, at block 716, payment request signaling device 110 may, by means of communication channel 118, pass the PCT to the merchant's POS device 104 to enable the merchant to validate the PCT.

Next, the POS device 104 may, at block 718, parse the received PCT to recover the various data fields in the token i.e., at least (i) the merchant identifier corresponding to the merchant, (ii) the bill identifier corresponding to the bill, and (iii) the total amount corresponding to the bill.

At block 720 the merchant may, after validating the data recovered from the PCT, accept the PCT as proof of payment of the merchant's bill by the customer. The merchant's POS device 104 may then, at block 720, generate a hardcopy of the PCT on an output device (not shown) or save the PCT on a storage device (not shown) as proof of payment.

The embodiments disclosed herein provide a technical improvement over traditional payment systems. For example, to pay for a meal in a restaurant, a customer may have to provide his or her credit card to a restaurant employee. The employee may then take this card to a POS device to initiate the payment process then return the card and a bill to the customer. During this period of time, the credit card is out of the customer's control. Thus, the customer's credit card account may be vulnerable to fraud (e.g., the employee writes down or takes a picture of the credit card number), and the customer may be subject to identity theft.

In contrast, the disclosed embodiments eliminate these possibilities, because a credit card need not be used, and if it is, it does not need to leave the customer's control. The customer is able to view the bill and pay it securely on his or her computing device. The customer's credentials and/or personal information need not be available to the restaurant employees. Therefore, through the use of this technical solution, the electronic payment transaction is simplified and its security is improved.

Further, this technical solution presents an improvement over existing electronic payment systems. Namely, in some existing electronic payment systems, the total amount payable might not be available to the customer in electronic format, resulting in the user having to re-type or to re-enter the amount, thereby increasing the likelihood of errors and resultant incorrect payment transactions. In contrast, the disclosed embodiments eliminate the need to manually enter the payment amount. A digital representation of the payment amount associated with an electronic payment transaction may be transmitted with the payment request and may be received by the listener app. The listener app may share the file representing the electronic payment transaction with the payment app. The payment app may automatically transmit the payment amount to the transaction server without the user having to manually enter the amount to be paid.

IV. Additional Example Operations

Figure 8:
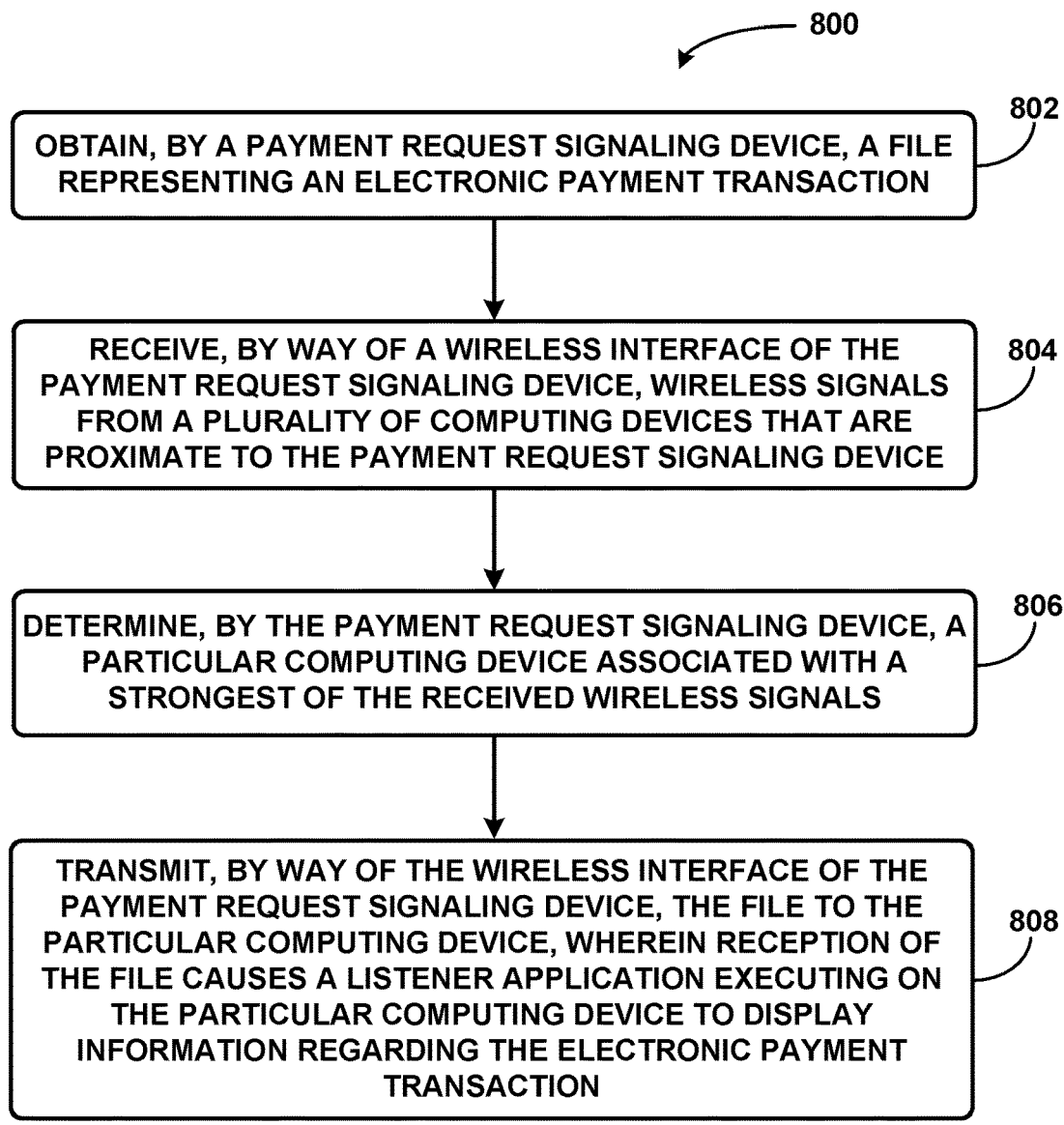
FIG. 8 is a flow chart illustrating example operations of a payment request signaling device, in accordance with an example embodiment.

FIG. 8 illustrates example operations that may be performed by, for example, a payment request signaling device to carry out transactions between, for example, merchant and customer. Specifically, in block 802 of flow diagram 800, a payment request signaling device may obtain a file representing an electronic payment transaction.

In block, 804, the payment request signaling device may receive, by way of a wireless interface of the payment request signaling device, wireless signals from a plurality of computing devices that are proximate to the payment request signaling device.

In block 806, the payment request signaling device may determine a particular computing device associated with a strongest of the received wireless signals. The particular computing device associated with the strongest of the received wireless signals may be a computing device closest to the payment request signaling device. In one example, a customer may be paying for a meal at a restaurant. The payment request signaling device may be placed on the customer's table when the customer is ready to pay. Accordingly, the customer's computing device may be the closest device to the payment request signaling device and may thus be associated with the highest signal strength as measured by the payment request signaling device.

In block 808, the payment request signaling device may transmit, by way of the wireless interface of the payment request signaling device, the file to the particular computing device. Reception of the file may cause a listener application executing on the particular computing device to display information regarding the electronic payment transaction. Thus, the customer using the particular computing device may be able to pay the bill.

In some embodiments, the wireless interface of the payment request signaling device may be a Bluetooth wireless interface. Accordingly, the wireless signals received from the plurality of computing devices may be Bluetooth wireless signals.

In some embodiments, determining the particular computing device associated with the strongest of the received wireless signals may include determining a first particular computing device and a second particular computing device. The first computing device and the second computing device may be associated with a strongest two of the received wireless signals. Transmitting the file to the particular computing device may include transmitting the file to the first particular computing device and the second particular computing device.

In some embodiments, transmitting the file to the particular computing device may include transmitting the file at a transmit signal strength that is inversely proportional to the strongest of the received wireless signals. Thus, only the computing device closest to the payment request signaling device may receive transmission of the file. The payment request signaling device may determine the transmit signal strength by accessing a lookup table that maps the strongest of the received wireless signals to the transmit signal strength.

In some embodiments, the payment request signaling device may transmit, by way of the wireless interface of the payment request signaling device, an access code associated with the listener application. Each of the plurality of computing devices may be executing a respective active instance of a listener application. The wireless signals received from the plurality of computing devices may be generated in response to the respective active instances of the listener application transmitting respective responses to the access code.

In some embodiments, the payment request signaling device may receive, by way of the wireless interface of the payment request signaling device, a payment confirmation token (PCT) from the particular computing device. The PCT may indicate successful payment of the electronic payment transaction. Payment of the electronic payment transaction may be performed using a payment application executing on the particular computing device. The payment request signaling device may provide, to a point-of-sale (POS) device, the PCT received from the particular computing device.

In some embodiments, the PCT may include (i) a merchant identifier associated with the electronic payment transaction, (ii) a bill identifier of a bill associated with the electronic payment transaction, and (iii) a total amount due corresponding to the bill.

In some embodiments, the POS device may receive, from the payment request signaling device, the PCT that the payment signaling device received from the particular computing device. The POS device may provide instructions to generate, by an output device, a hardcopy of the PCT. Additionally or alternatively, the POS device may provide instructions to store, on a storage device, a copy of the PCT.

Figure 9:
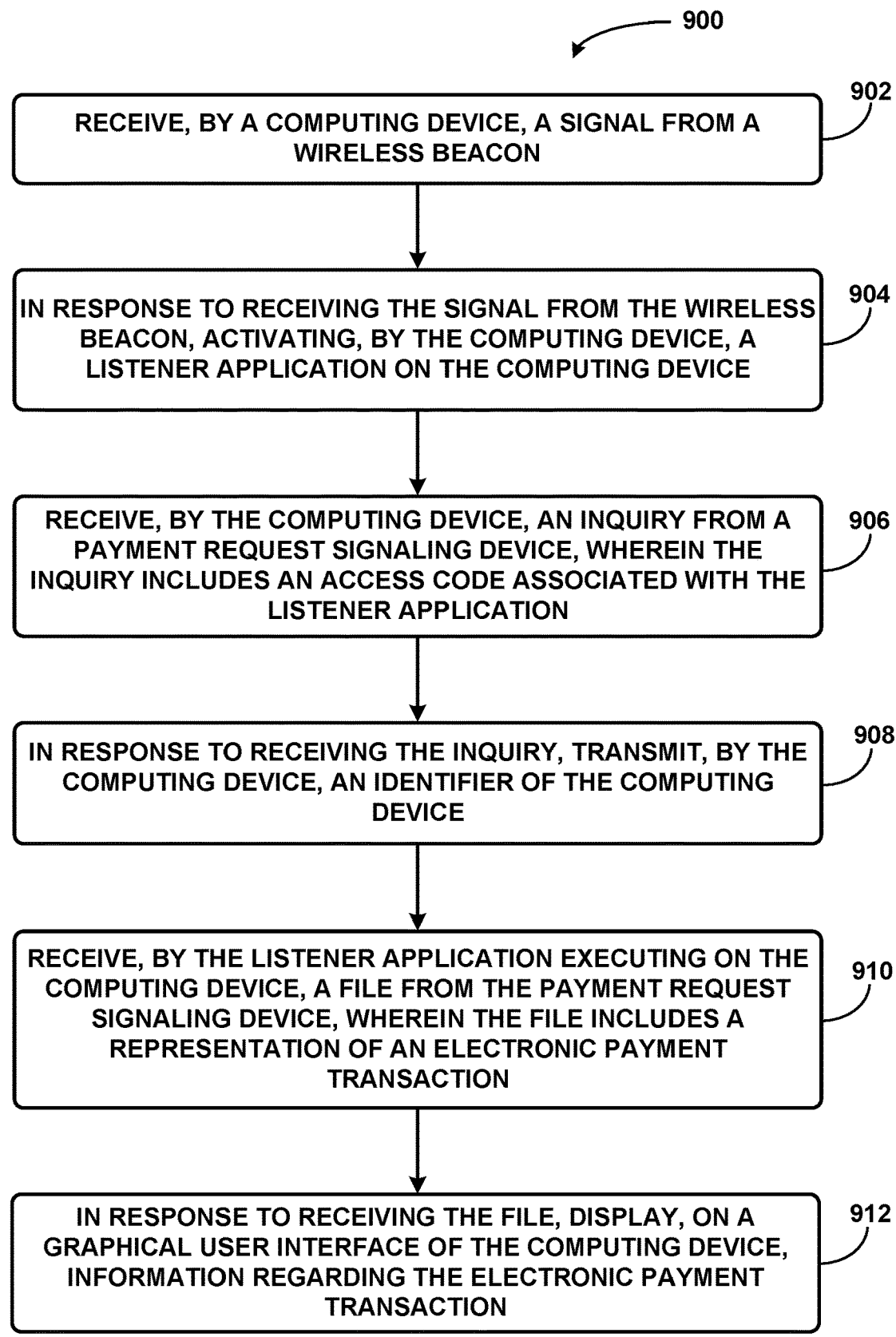
FIG. 9 is a flow chart illustrating example operations of a computing device, in accordance with an example embodiment.

FIG. 9 illustrates example operations that may be performed by, for example, a computing device to carry out transactions between, for example, merchant and customer. The computing device may be a device owned or operated by the customer.

In block 902 of flow diagram 900, a computing device may receive a signal from a wireless beacon. The wireless beacon may be, for example, a wireless beacon in a restaurant or another merchant locale.

In block 904, in response to receiving the signal from the wireless beacon, the computing device may activate a listener application on the computing device. Activation of the listener application may allow the computing device to listen for messages from a payment request signaling device.

In block 906, the computing device may receive an inquiry from a payment request signaling device (e.g., payment request processing device configured to perform the operations of flow diagram 800). The inquiry may include an access code associated with the listener application on the computing device. The access code may allow the inquiry from the payment request signaling device to be ignored by computing devices that do not have stored thereon the listener application.

In block 908, the computing device may, in response to receiving the inquiry, transmit an identifier of the computing device.

In block 910, a file from the payment request signaling device may be received by the listener application executing on the computing device. The file may include a representation of an electronic payment transaction.

In block 912, in response to receiving the file, information regarding the electronic payment transaction may be displayed on a graphical user interface of the computing device. A user of the computing device may view the information and chose to decline payment or select a payment instrument with which to pay the electronic payment transaction.

In some embodiments, activating the listener application on the computing device may include beginning execution of the listener application on the computing device.

In some embodiments, the information displayed regarding the electronic payment transaction may include options to pay or decline payment of the electronic payment transaction In some embodiments, the computing device may receive, via the graphical user interface, selection of the option to pay. In response to receiving the selection of the option to pay, the computing device may transmit an indication of payment of the electronic payment transaction to a transaction server. The indication of payment may include an indication of a payment instrument associated with the computing device.

In some embodiments, the computing device may receive, from the transaction server, a transaction failure notification indicating that payment of the electronic payment transaction was unsuccessful. In response to receiving the transaction failure notification, the computing device may receive, via the graphical user interface, selection of an alternative payment instrument. In response to receiving the selection of the alternative payment instrument, the computing device may transmit an indication of the alternative payment instrument to the transaction server.

In some embodiments, the computing device may display, on the graphical user interface of the computing device, an indication of the transaction failure notification.

In some embodiments, the computing device may store, on the computing device, a virtual receipt indicating the transaction failure.

In some embodiments, the computing device may receive, from the transaction server, a transaction success notification indicating that payment of the electronic payment transaction was successful. The transaction success notification may include a payment confirmation token (PCT). The computing device may provide, to the payment request signaling device, the PCT received from the transaction server.

In some embodiments, the PCT may include (i) a merchant identifier associated with the electronic payment transaction, (ii) a bill identifier of a bill associated with the electronic payment transaction, and (iii) a total amount due corresponding to the bill.

In some embodiments, the computing device may store, on the computing device, a virtual receipt indicating the transaction success. The virtual receipt may include that PCT.

In some embodiments, the computing device may display, on the graphical user interface of the computing device, an indication of the transaction success.

Figure 10:
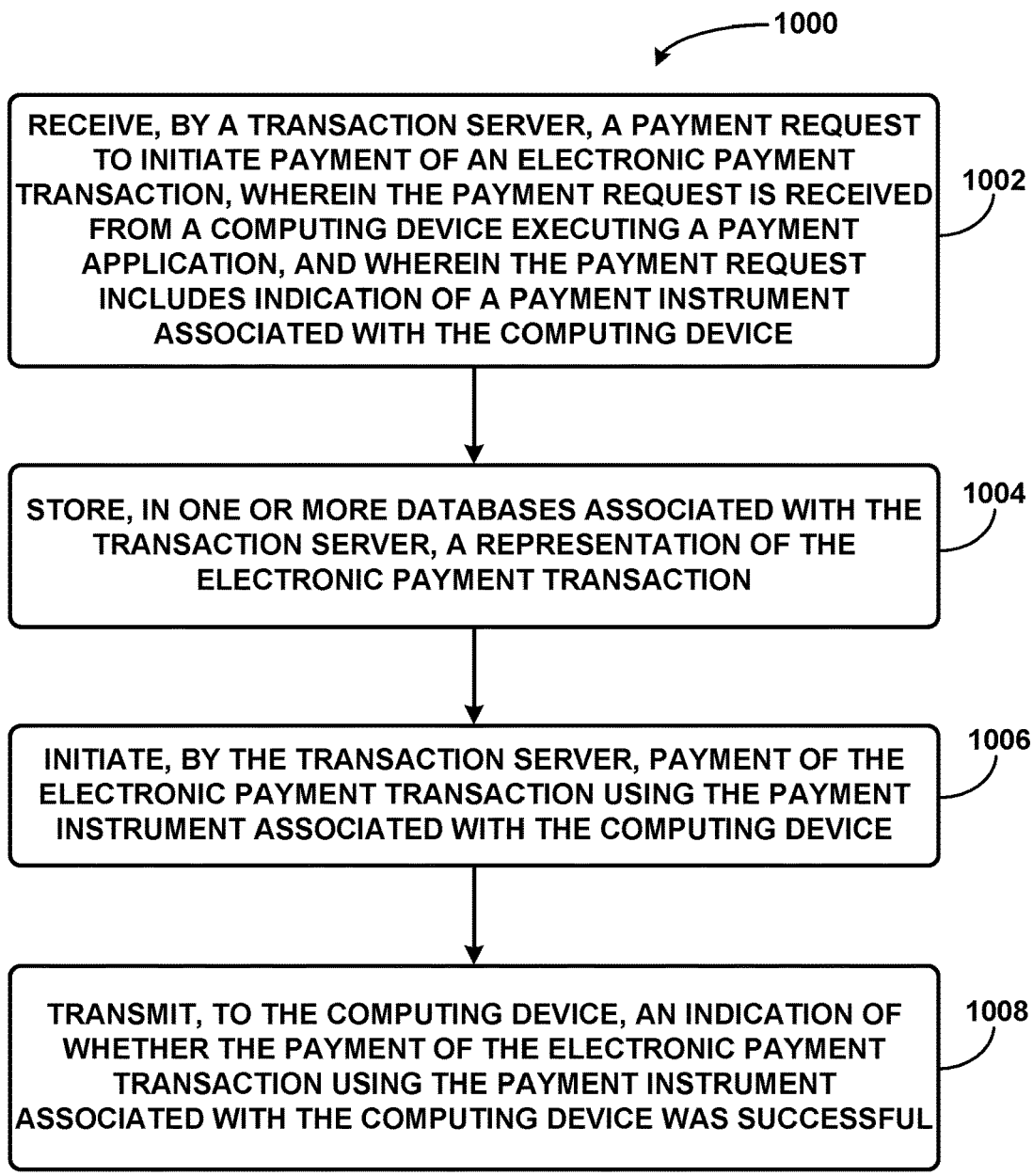
FIG. 10 is a flow chart illustrating operations of a transaction server, in accordance with an example embodiment.

FIG. 10 illustrates example operations that may be performed by, for example, a transaction server to carry out transactions between, for example, merchant and customer. Specifically, in block 1002 of flow diagram 1000, a transaction server may receive a payment request to initiate payment of an electronic payment transaction. The payment request may be received from a computing device executing a payment application (e.g., computing device configured to perform the operations of flow diagram 900). The payment request may include indication of a payment instrument associated with the computing device.

In block 1004, the transaction server may store, in one or more databases associated with the transaction server, a representation of the electronic payment transaction.

In block 1006, the transaction server may initiate payment of the electronic payment transaction using the payment instrument associated with the computing device. The transaction server may carry out the payment process locally, on the transaction server. Alternatively, a payment server different from the transaction server may be used to carry out the payment process.

In block 1008, the transaction server may transmit, to the computing device, an indication of whether the payment of the electronic payment transaction using the payment instrument associated with the computing device was successful. In the event of unsuccessful payment, the transaction server may also request that an alternative payment instrument be provided for payment of the electronic payment transaction.

In some embodiments, initiating payment of the electronic payment transaction may include transmitting, to a payment processing server, instructions for payment of the electronic payment transaction using the payment instrument associated with the computing device.

In some embodiments, the instructions for payment may include an amount authorized for payment and a merchant identifier associated with the electronic payment transaction.

In some embodiments, the indication of whether the payment was successful may include a transaction failure notification indicating that the payment was unsuccessful.

The transaction server may additionally transmit, to the computing device, a request for selection of an alternative payment instrument.

In some embodiments, the transaction server may receive, from the computing device, an indication of an alternative payment instrument associated with the computing device.

In some embodiments, the transaction server may initiate payment of the electronic payment transaction using the alternative payment instrument associated with the computing device. The transaction server may transmit, to the computing device, an indication of whether the payment of the electronic payment transaction using the alternative payment instrument associated with the computing device was successful.

In some embodiments, the indication of whether the payment was successful may include a transaction success notification indicating that the payment was successful. The transaction success notification may include a payment confirmation token (PCT).

In some embodiments, the PCT may include (i) a merchant identifier associated with the electronic payment transaction, (ii) a bill identifier of a bill associated with the electronic payment transaction, and (iii) a total amount due corresponding to the bill.

In some embodiments, the transaction server may retrieve, from a user profile stored on the one or more databases associated with the transaction server, data associated with the payment instrument. The data associated with the payment instrument may include at least one of (i) a credit or debit card number, (ii) a cardholder name, (iii) a card expiration date, (iv) a card verification code (CVC), or (v) a personal identification number (PIN).

V. Additional Example Embodiments

Clearly, numerous variations and permutations are possible to the embodiments without departing from the scope of this disclosure: Some of these variations and permutations are described below.

1. It is possible that a particular computing device 106 may receive payment requests from multiple payment request signaling devices 110. In such an eventuality, listener app 167 on the computing device may display an ordered list of payment requests received from the multiple payment request signaling devices, from those with strongest to weakest corresponding Bluetooth signal strengths. The user may then select, from the list, the appropriate payment request to pay.

2. Prior to presenting a received PCT to the merchant's payment request signaling device as proof of payment, the payment app 164 on the computing device 106 may itself also parse the PCT to recover the data in the token for the customer to verify.

3. In some examples, the POS device 104 may be configured to include the functionality attributed to the payment request signaling device 110, thereby removing the necessity for a separate payment request signaling device.

4. In some examples, the POS device 104 may be configured to include the functionality attributed to the electronic beacon 108, thereby removing the necessity for a separate electronic beacon.

5. In some examples, the POS device may be configured to include the functionality attributed to both the electronic beacon 108 and the payment request signaling device 110, thereby removing the necessity for separate electronic beacon and payment request signaling device.

6. In accordance with the disclosed embodiments, instead of the transaction server 102 sending the particulars of the payment transaction (for example, the amount due and the payment details) to a payment processor (not shown) for processing, the transaction server 102 may process the payment itself.

The system 100 enables a payment request to be sent directly from any merchant's pay point, such as a point-of-sale device or an automated payment terminal, directly to a customer's mobile phone. The customer may then make the payment directly from the customer's mobile phone. The customer's mobile phone may then send a payment confirmation back to the merchant's pay point, or may notify an external service that the payment transaction has completed successfully.

In the example embodiment, three entities are involved in the payment transaction:
  i. a merchant (i.e. the beneficiary), which can be associated with one or more merchant devices;
  ii. a customer (i.e., the paying entity), which can be associated with a customer device; and
  iii. a transaction server.

As one example, the one or more merchant devices can include the herein-described functionality of the POS device 104, the electronic beacon 108, the payment request signaling device 110. As a second example, the customer device can include the herein-described functionality of the computing device 106. As a third example, the transaction server can include the herein-described functionality of the transaction server 102. Other examples are possible as well.

Each of these entities and associated devices can play a specific role and perform specific functions, namely:
  i. The merchant devices:
     The electronic beacon
        a. broadcasts the availability of an electronic payment service; and
        b. activates a listener application on the device.
     The payment request signaling device
        a. discovers all customer devices with an active listener application;
        b. determines the relative distance of each discovered customer device; and
        c. transmits a payment request to the nearest customer device.
  ii. The customer device:
     a. passively listens for electronic payment service broadcasts;
     b. activates a listener application to receive a payment requests from the merchant devices;
     c. displays an ordered list of payment requests received from the merchant devices;
     d. submits a selected payment request to a transaction server;
     e. receives a payment confirmation token from the transaction server; and
     f. presents the payment confirmation token to the merchant devices.
  iii. The transaction server:
     a. receives a payment request from a customer device;
     b. conducts the payment transaction;
     c. creates a payment confirmation token; and
     d. transmits the payment confirmation token to the customer device.

The merchant devices are thus able to provide a customer with an electronic payment request and to receive and verify a payment confirmation token returned from the customer.

VI. Further Example Embodiments

The following clauses are offered as further description of the disclosure.

(1) A method comprising:

obtaining, by a payment request signaling device, a file representing an electronic payment transaction;

receiving, by way of a wireless interface of the payment request signaling device, wireless signals from a plurality of computing devices that are proximate to the payment request signaling device;

determining, by the payment request signaling device, a particular computing device associated with a strongest of the received wireless signals; and transmitting, by way of the wireless interface of the payment request signaling device, the file to the particular computing device, wherein reception of the file causes a listener application executing on the particular computing device to display information regarding the electronic payment transaction.

(2) The method of clause 1, wherein the wireless interface is a Bluetooth wireless interface, and the wireless signals are Bluetooth wireless signals.

(3) The method of any of clauses 1-2, wherein determining the particular computing device associated with the strongest of the received wireless signals comprises determining a first particular computing device and a second particular computing device associated with a strongest two of the received wireless signals, and wherein transmitting the file to the particular computing device comprises transmitting the file to the first particular computing device and the second particular computing device.

(4) The method of any of clauses 1-3, wherein transmitting the file to the particular computing device comprises transmitting the file at a transmit signal strength that is inversely proportional to the strongest of the received wireless signals.

(5) The method of clause 4, wherein the payment request signaling device determines the transmit signal strength by accessing a lookup table that maps the strongest of the received wireless signals to the transmit signal strength.

(6) The method of any of clauses 1-5, further comprising:

transmitting, by way of the wireless interface of the payment request signaling device, an access code associated with the listener application, wherein each of the plurality of computing devices is executing a respective active instance of the listener application, and wherein the wireless signals received from the plurality of computing devices are generated in response to the respective active instances of the listener application transmitting respective responses to the access code.

(7) The method of any of clauses 1-6, further comprising:

receiving, by way of the wireless interface of the payment request signaling device, a payment confirmation token (PCT) from the particular computing device, wherein the PCT indicates successful payment of the electronic payment transaction, and wherein payment of the electronic payment transaction is performed using a payment application executing on the particular computing device; and providing, to a point-of-sale (POS) device, the PCT received from the particular computing device.

(8) The method of clause 7, wherein the PCT comprises (i) a merchant identifier associated with the electronic payment transaction, (ii) a bill identifier of a bill associated with the electronic payment transaction, and (iii) a total amount due corresponding to the bill.

(9) The method of any of clauses 7-8, further comprising:

receiving, by the POS device, the PCT received from the particular computing device;

providing, by the POS device, instructions to generate, by an output device, a hardcopy of the PCT.

(10) The method of any of clauses 7-9, further comprising:

receiving, by the POS device, the PCT received from the particular computing device;

providing, by the POS device, instructions to store, on a storage device, a copy of the PCT.

(11) An article of manufacture including a non-transitory computer-readable medium, having stored thereon program instructions that, upon execution by a computing device, cause the computing device to perform the operations of any of clauses 1-10.

(12) A computing device comprising:

at least one processor;

memory; and program instructions, stored in the memory, that upon execution by the at least one processor cause the computing device to perform the operations of any of clauses 1-10.

(13) A system comprising:

means for obtaining, by a payment request signaling device, a file representing a request for electronic payment;

means for receiving, by way of a wireless interface of the payment request signaling device, wireless signals from a plurality of computing devices that are proximate to the payment request signaling device;

means for determining, by the payment request signaling device, a particular computing device associated with a strongest of the received wireless signals; and means for transmitting, by way of the wireless interface of the payment request signaling device, the file to the particular computing device, wherein reception of the file causes a listener application executing on the particular computing device to display information regarding the electronic payment transaction.

(14) A method comprising:

receiving, by a computing device, a signal from a wireless beacon;

in response to receiving the signal from the wireless beacon, activating, by the computing device, a listener application on the computing device;

receiving, by the computing device, an inquiry from a payment request signaling device, wherein the inquiry includes an access code associated with the listener application;

in response to receiving the inquiry, transmitting, by the computing device, an identifier of the computing device;

receiving, by the listener application executing on the computing device, a file from the payment request signaling device, wherein the file includes a representation of an electronic payment transaction; and in response to receiving the file, displaying, on a graphical user interface of the computing device, information regarding the electronic payment transaction.

(15) The method of clause 14, wherein activating the listener application on the computing device comprises beginning execution of the listener application on the computing device.

(16) The method of any of clauses 14-15, wherein the information displayed regarding the electronic payment transaction includes options to pay or decline payment of the electronic payment transaction.

(17) The method of clause 16, further comprising:
receiving, via the graphical user interface, selection of the option to pay; and
in response to receiving the selection of the option to pay, transmitting an indication of payment of the electronic payment transaction to a transaction server.

(18) The method of clause 17, further comprising:
receiving, from the transaction server, a transaction failure notification indicating that payment of the electronic payment transaction was unsuccessful;
in response to receiving the transaction failure notification, receiving, via the graphical user interface, selection of an alternative payment instrument; and
in response to receiving the selection of the alternative payment instrument, transmitting an indication of the alternative payment instrument to the transaction server.

(19) The method of clause 18, further comprising:
displaying, on the graphical user interface of the computing device, an indication of the transaction failure notification.

(20) The method of any of clauses 18-19, further comprising:
storing, on the computing device, a virtual receipt indicating the transaction failure.

(21) The method of any of clauses 17-20, further comprising:
receiving, from the transaction server, a transaction success notification indicating that payment of the electronic payment transaction was successful, wherein the transaction success notification includes a payment confirmation token (PCT); and
providing, to the payment request signaling device, the PCT received from the transaction server.

(22) The method of clause 21, wherein the PCT comprises (i) a merchant identifier associated with the electronic payment transaction, (ii) a bill identifier of a bill associated with the electronic payment transaction, and (iii) a total amount due corresponding to the bill.

(23) The method of any of clauses 21-22, further comprising:
storing, on the computing device, a virtual receipt indicating the transaction success, wherein the virtual receipt includes that PCT.

(24) The method of any of clauses 21-23, further comprising:
displaying, on the graphical user interface of the computing device, an indication of the transaction success.

(25) An article of manufacture including a non-transitory computer-readable medium, having stored thereon program instructions that, upon execution by a computing device, cause the computing device to perform the operations of any of clauses 14-24.

(26) A computing device comprising:
at least one processor;
memory; and
program instructions, stored in the memory, that upon execution by the at least one processor cause the computing device to perform the operations of any of clauses 14-24.

(27) A system comprising:
means for receiving, by a computing device, a signal from a wireless beacon;
means for, in response to receiving the signal from the wireless beacon, activating, by the computing device, a listener application on the computing device;
means for receiving, by the computing device, an inquiry from a payment request signaling device, wherein the inquiry includes an access code associated with the listener application;
means for, in response to receiving the inquiry, transmitting, by the computing device, an identifier of the computing device;
means for receiving, by the listener application executing on the computing device, a file from the payment request signaling device, wherein the file includes a representation of an electronic payment transaction; and
means for, in response to receiving the file, displaying, on a graphical user interface of the computing device, information regarding the electronic payment transaction.

(28) A method comprising:
receiving, by a transaction server, a payment request to initiate payment of an electronic payment transaction, wherein the payment request is received from a computing device executing a payment application, and wherein the payment request includes an indication of a payment instrument associated with the computing device;
storing, in one or more databases associated with the transaction server, a representation of the electronic payment transaction;
initiating, by the transaction server, payment of the electronic payment transaction using the payment instrument associated with the computing device; and
transmitting, to the computing device, an indication of whether the payment of the electronic payment transaction using the payment instrument associated with the computing device was successful.

(29) The method of clause 28, wherein initiating payment of the electronic payment transaction comprises:
transmitting, to a payment processing server, instructions for payment of the electronic payment transaction using the payment instrument associated with the computing device.

(30) The method of any of clauses 28-29, wherein the instructions for payment comprise:
an amount authorized for payment; and
a merchant identifier associated with the electronic payment transaction.

(31) The method of any of clauses 28-30, wherein the indication of whether the payment was successful comprises a transaction failure notification indicating that the payment was unsuccessful, the method further comprising:
transmitting, to the computing device, a request for selection of an alternative payment instrument.

(32) The method of any of clauses 28-31, further comprising;
receiving, from the computing device, an indication of an alternative payment instrument associated with the computing device.

(33) The method of clause 32, further comprising:
initiating, by the transaction server, payment of the electronic payment transaction using the alternative payment instrument associated with the computing device; and
transmitting, to the computing device, an indication of whether the payment of the electronic payment transaction using the alternative payment instrument associated with the computing device was successful.

(34) The method of any of clauses 28-33, wherein the indication of whether the payment was successful comprises a transaction success notification indicating that the payment was successful, and wherein the transaction success notification includes a payment confirmation token (PCT).

(35) The method of clause 34, wherein the PCT comprises (i) a merchant identifier associated with the electronic payment transaction, (ii) a bill identifier of a bill associated with the electronic payment transaction, and (iii) a total amount due corresponding to the bill.

(36) The method of any of clauses 28-35, further comprising;

retrieving, from a user profile stored on the one or more databases associated with the transaction server, data associated with the payment instrument.

(37) The method of clause 36, wherein the data associated with the payment instrument comprises at least one of (i) a credit or debit card number, (ii) a cardholder name, (iii) a card expiration date, (iv) a card verification code (CVC), or (v) a personal identification number (PIN).

(38) An article of manufacture including a non-transitory computer-readable medium, having stored thereon program instructions that, upon execution by a computing device, cause the computing device to perform the operations of any of clauses 28-37.

(39) A computing device comprising:

at least one processor;

memory; and program instructions, stored in the memory, that upon execution by the at least one processor cause the computing device to perform the operations of any of clauses 28-37.

(40) A system comprising:

means for receiving, by a transaction server, an indication of payment of an electronic payment transaction, wherein the indication of payment is received from a computing device executing a payment application, and wherein the indication of payment includes indication of a payment instrument associated with the computing device;

means for storing, in one or more databases associated with the transaction server, a representation of the payment of the electronic payment transaction;

means for initiating, by the transaction server, payment of the electronic payment transaction using the payment instrument associated with the computing device; and means for transmitting, to the computing device, an indication of whether the payment of the electronic payment transaction using the payment instrument associated with the computing device was successful.

VII. Conclusion

Example embodiments have been described above. Those skilled in the art will understand that changes and modifications can be made to the described embodiments without departing from the true scope of the described embodiments as claimed.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the herein-described embodiments can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A method comprising:

obtaining, by a request signaling device via a communication interface and from a point-of-sale (POS) device, a file representing an electronic payment transaction;

broadcasting, by the request signaling device, one or more inquiry messages to a plurality of computing devices proximate to the request signaling device;

in response to the one or more inquiry messages, receiving, by the request signaling device via a wireless interface, wireless signals indicating respective identifiers from the plurality of computing devices proximate to the request signaling device;

determining, by the request signaling device, a particular computing device of the plurality of computing devices proximate to the request signaling device that is associated with a strongest of the received wireless signals;

transmitting, by the request signaling device via the wireless interface and at a transmit signal strength that is inversely proportional to the strongest of the received wireless signals, the file representing the electronic payment transaction to the particular computing device associated with the strongest of the received wireless signals, wherein reception of the file representing the electronic payment transaction at the particular computing device associated with the strongest of the received wireless signals causes a listener application that is actively executing on the particular computing device associated with the strongest of the received wireless signals to display, via a graphical user interface, information regarding the file representing the electronic payment transaction, and wherein the transmit signal strength causes other computing devices of the plurality of computing devices to be less likely to receive the file representing the electronic payment transaction than the particular computing device associated with the strongest of the received wireless signals;

receiving, by the request signaling device, a payment confirmation token (PCT) from the particular computing device associated with the strongest of the received wireless signals; and in response to receiving the PCT, providing, by the request signaling device, the PCT to the POS device, wherein reception of the PCT by the POS device causes the POS device to validate the PCT as proof of payment by way of the particular computing device associated with the strongest of the received wireless signals.

2. The method of claim 1, wherein the wireless interface is a Bluetooth wireless interface, and the received wireless signals are Bluetooth wireless signals.

3. The method of claim 1, wherein determining, by the request signaling device, the particular computing device associated with the strongest of the received wireless signals comprises determining, by the request signaling device, a first particular computing device and a second particular computing device associated with a strongest two of the received wireless signals, and wherein transmitting, by the request signaling device, the file representing the electronic payment transaction to the particular computing device comprises transmitting, by the request signaling device, the file representing the electronic payment transaction to the first particular computing device and the second particular computing device.

4. The method of claim 1, wherein the request signaling device determines the transmit signal strength by accessing a lookup table that maps the strongest of the received wireless signals to the transmit signal strength.

5. The method of claim 1, further comprising:
transmitting, by the request signaling device, an access code associated with the listener application, wherein each of the plurality of computing devices is executing a respective active instance of the listener application, and wherein the received wireless signals are generated in response to the respective active instances of the listener application transmitting respective responses to the access code.

6. The method of claim 1, 1, wherein the PCT comprises (i) a merchant identifier associated with the electronic payment transaction, (ii) a bill identifier of a bill associated with the electronic payment transaction, and (iii) a total amount due corresponding to the bill.

7. The method of claim 1, wherein the POS device provides instructions to an output device to generate a hardcopy of the PCT.

8. The method of claim 1, wherein the POS device provides instructions to store, on a storage device, a copy of the PCT.

9. The method of claim 1, wherein the particular computing device associated with the strongest of the received wireless signals causes the listener application to transition from a non-active state to an active state in response to receiving a broadcast signal from a wireless beacon.

10. A non-transitory computer-readable medium containing program instructions that, when executed by a processor of a request signaling device, cause the request signaling device to perform operations comprising:

obtaining, via a communication interface and from a point-of-sale (POS) device, a file representing an electronic payment transaction;

broadcasting one or more inquiry messages to a plurality of computing devices proximate to the request signaling device;

in response to the one or more inquiry messages, receiving, via a wireless interface of the request signaling device, wireless signals indicating respective identifiers from the plurality of computing devices proximate to the request signaling device;

determining a particular computing device of the plurality of computing devices proximate to the request signaling device that is associated with a strongest of the received wireless signals;

transmitting, via the wireless interface and at a transmit signal strength that is inversely proportional to the strongest of the received wireless signals, the file representing the electronic payment transaction to the particular computing device associated with the strongest of the received wireless signals, wherein reception of the file representing the electronic payment transaction at the particular computing device associated with the strongest of the received wireless signals causes a listener application that is actively executing on the particular computing device associated with the strongest of the received wireless signals to display, via a graphical user interface, information regarding the file representing the electronic payment transaction, and wherein the transmit signal strength causes other computing devices of the plurality of computing devices to be less likely to receive the file representing the electronic payment transaction than the particular computing device associated with the strongest of the received wireless signals;

receiving a payment confirmation token (PCT) from the particular computing device associated with the strongest of the received wireless signals; and in response to receiving the PCT, providing the PCT to the POS device, wherein reception of the PCT by the POS device causes the POS device to validate the PCT as proof of payment by way of the particular computing device associated with the strongest of the received wireless signals.

11. The non-transitory computer-readable medium of claim 10, wherein the program instructions, when executed by the processor of the request signaling device, further cause the request signaling device to perform operations comprising:

transmitting, via the wireless interface, an access code associated with the listener application, wherein each of the plurality of computing devices is executing a respective active instance of the listener application, and wherein the received wireless signals are generated in response to the respective active instances of the listener application transmitting respective responses to the access code.

12. The non-transitory computer-readable medium of claim 10, wherein the PCT comprises (i) a merchant identifier associated with the electronic payment transaction, (ii) a bill identifier of a bill associated with the electronic payment transaction, and (iii) a total amount due corresponding to the bill.

13. The non-transitory computer-readable medium of claim 10, wherein the POS device provides instructions to an output device to generate a hardcopy of the PCT.

14. The non-transitory computer-readable medium of claim 10, wherein the POS device provides instructions to store, on a storage device, a copy of the PCT.

15. The non-transitory computer-readable medium of claim 10, wherein the particular computing device associated with the strongest of the received wireless signals causes the listener application to transition from a non-active state to an active state in response to receiving a broadcast signal from a wireless beacon.

16. A request signaling device comprising:
a wireless interface;
one or more processors; and
memory storing program instructions that, upon execution by the one or more processors, cause the request signaling device to perform operations comprising:
obtaining, via a communication interface and from a point-of-sale (POS) device, a file representing an electronic payment transaction;
broadcasting one or more inquiry messages to a plurality of computing devices proximate to the request signaling device;
in response to the one or more inquiry messages, receiving, via the wireless interface, wireless signals indicating respective identifiers from the plurality of computing devices proximate to the request signaling device;
determining a particular computing device of the plurality of computing devices proximate to the request signaling device that is associated with a strongest of the received wireless signals;
transmitting, via the wireless interface and at a transmit signal strength that is inversely proportional to the strongest of the received wireless signals, the file representing the electronic payment transaction to the particular computing device associated with the strongest of the received wireless signals,
wherein reception of the file representing the electronic payment transaction at the particular computing device associated with the strongest of the received wireless signals causes a listener application that is actively executing on the particular computing device associated with the strongest of the received wireless signals to display, via a graphical user interface, information regarding the file representing the electronic payment transaction, and
wherein the transmit signal strength causes other computing devices of the plurality of computing devices to be less likely to receive the file representing the electronic payment transaction than the particular computing device associated with the strongest of the received wireless signals;
receiving a payment confirmation token (PCT) from the particular computing device associated with the strongest of the received wireless signals; and
in response to receiving the PCT, providing the PCT to the POS device, wherein reception of the PCT by the POS device causes the POS device to validate the PCT as proof of payment by way of the particular computing device associated with the strongest of the received wireless signals.

17. The request signaling device of claim 16, the memory further storing program instructions that, upon execution by the one or more processors, causes the request signaling device to further perform operations comprising:

transmitting, via the wireless interface, an access code associated with the listener application, wherein each of the plurality of computing devices is executing a respective active instance of the listener application, and wherein the received wireless signals are generated in response to the respective active instances of the listener application transmitting respective responses to the access code.

18. The request signaling device of claim 16, wherein the PCT comprises (i) a merchant identifier associated with the electronic payment transaction, (ii) a bill identifier of a bill associated with the electronic payment transaction, and (iii) a total amount due corresponding to the bill.

19. The request signaling device of claim 16, wherein the POS device provides instructions to an output device to generate a hardcopy of the PCT.

20. The request signaling device of claim 16, wherein the particular computing device associated with the strongest of the received wireless signals causes the listener application to transition from a non-active state to an active state in response to receiving a broadcast signal from a wireless beacon.

* * * * *